(12) United States Patent
Gupta et al.

(10) Patent No.: US 11,460,313 B2
(45) Date of Patent: Oct. 4, 2022

(54) APPARATUS, METHOD, AND COMPUTER PROGRAM PRODUCT FOR FIELD DEVICE MAINTENANCE REQUEST MANAGEMENT

(71) Applicant: Honeywell International Inc., Morris Plains, NJ (US)

(72) Inventors: Tarun Gupta, Bangalore (IN); Chetan Siddapura Kallappa, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 37 days.

(21) Appl. No.: 16/654,275

(22) Filed: Oct. 16, 2019

(65) Prior Publication Data
US 2021/0116262 A1  Apr. 22, 2021

(51) Int. Cl.
*G01C 21/36* (2006.01)
*G06F 9/451* (2018.01)
(Continued)

(52) U.S. Cl.
CPC ..... *G01C 21/3667* (2013.01); *G06F 3/04842* (2013.01); *G06F 9/451* (2018.02); *H04L 67/36* (2013.01)

(58) Field of Classification Search
CPC ..... G06T 19/006; H04L 67/125; H04L 67/36; H04W 4/026; G01C 21/3667; G06F 9/451; G06F 3/04842
See application file for complete search history.

(56) References Cited

U.S. PATENT DOCUMENTS

| 7,231,415 B1 * | 6/2007 | Eslambolchi ....... H04L 41/0645 709/200 |
| 2006/0031626 A1 | 2/2006 | Rapp et al. |

(Continued)

FOREIGN PATENT DOCUMENTS

WO  2015/000499 A1  1/2015

OTHER PUBLICATIONS

European search opinion dated Dec. 23, 2020 for EP Application No. 20202311.
(Continued)

*Primary Examiner* — Michael Roswell
(74) *Attorney, Agent, or Firm* — Alston & Bird LLP

(57) ABSTRACT

Various embodiments of the present disclosure are directed to field device maintenance request management associated with one or more faulty field devices. Non-limiting example systems in which embodiments function include control system in communication with a plurality of field devices and associated sensors, and at least one client device. Embodiments include apparatuses, computer program products, and methods for retrieving monitoring data, identifying faults, retrieving request handling information, generating a corresponding field device maintenance request, and transmitting the maintenance request to one or more client devices, as well as optionally setting one or more operational modes for field devices, and/or processing a response from the client device. Other embodiments receive a field device maintenance request, extract request handling information, various particular interfaces for efficient analysis, and optionally include interface elements for providing and causing storage of a response to the request.

20 Claims, 11 Drawing Sheets

(51) Int. Cl.
  *G06F 3/04842* (2022.01)
  *H04L 67/75* (2022.01)

(56) References Cited

U.S. PATENT DOCUMENTS

| | | | | |
|---|---|---|---|---|
| 2010/0058248 | A1* | 3/2010 | Park | G06Q 10/06 715/851 |
| 2012/0078391 | A1* | 3/2012 | Zornio | G05B 19/0425 700/80 |
| 2013/0288719 | A1* | 10/2013 | Alonzo | H04W 4/026 455/457 |
| 2014/0121789 | A1* | 5/2014 | Brandes | G05B 23/027 700/80 |
| 2016/0140868 | A1* | 5/2016 | Lovett | G06T 19/006 434/118 |
| 2017/0032022 | A1* | 2/2017 | Srinivasan | G06F 16/48 |
| 2018/0206096 | A1* | 7/2018 | Sharma | H04L 67/125 |
| 2018/0268704 | A1* | 9/2018 | Balk | G08G 1/202 |

OTHER PUBLICATIONS

European search report dated Dec. 23, 2020 for EP Application No. 20202311.

* cited by examiner

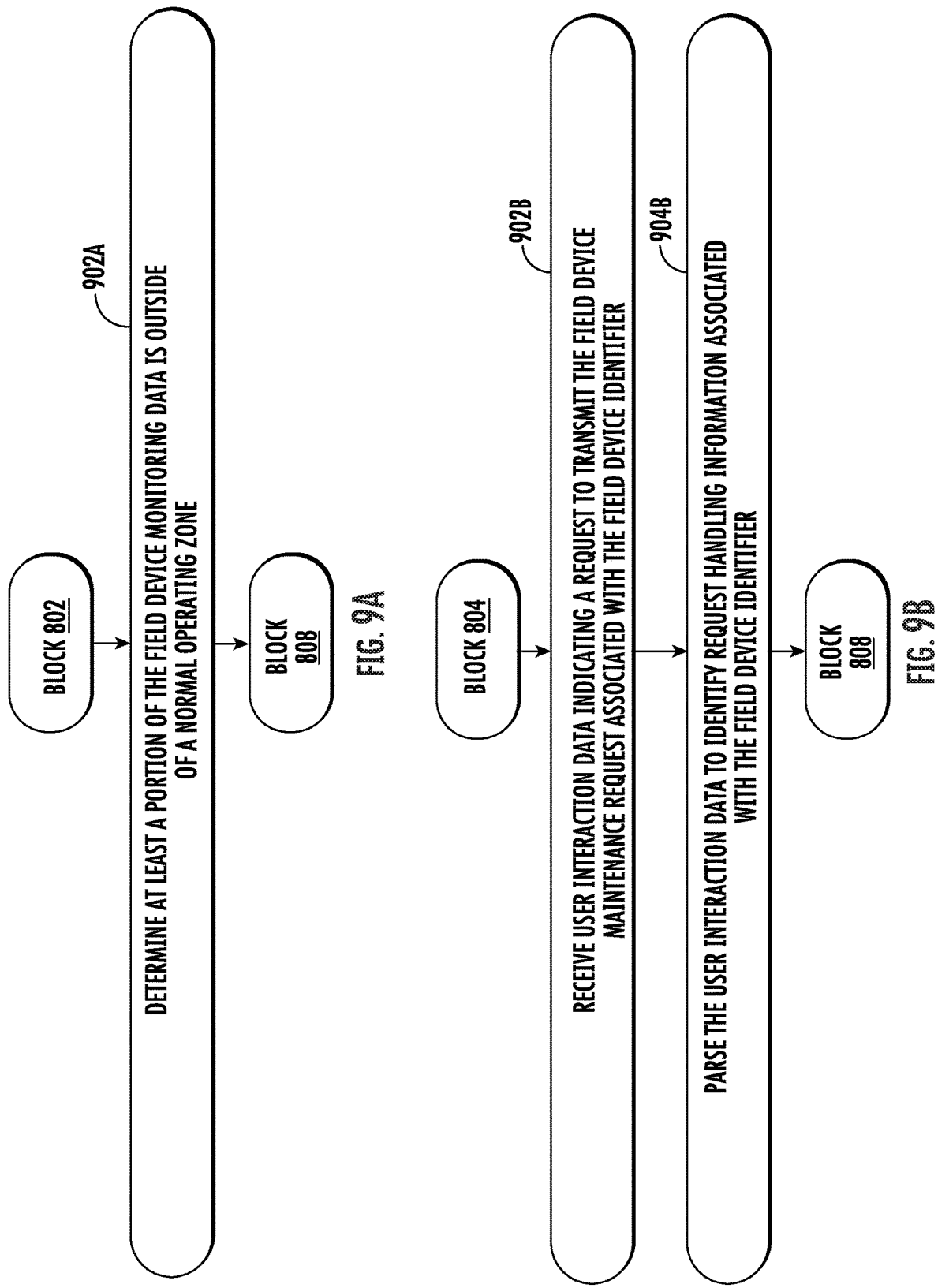

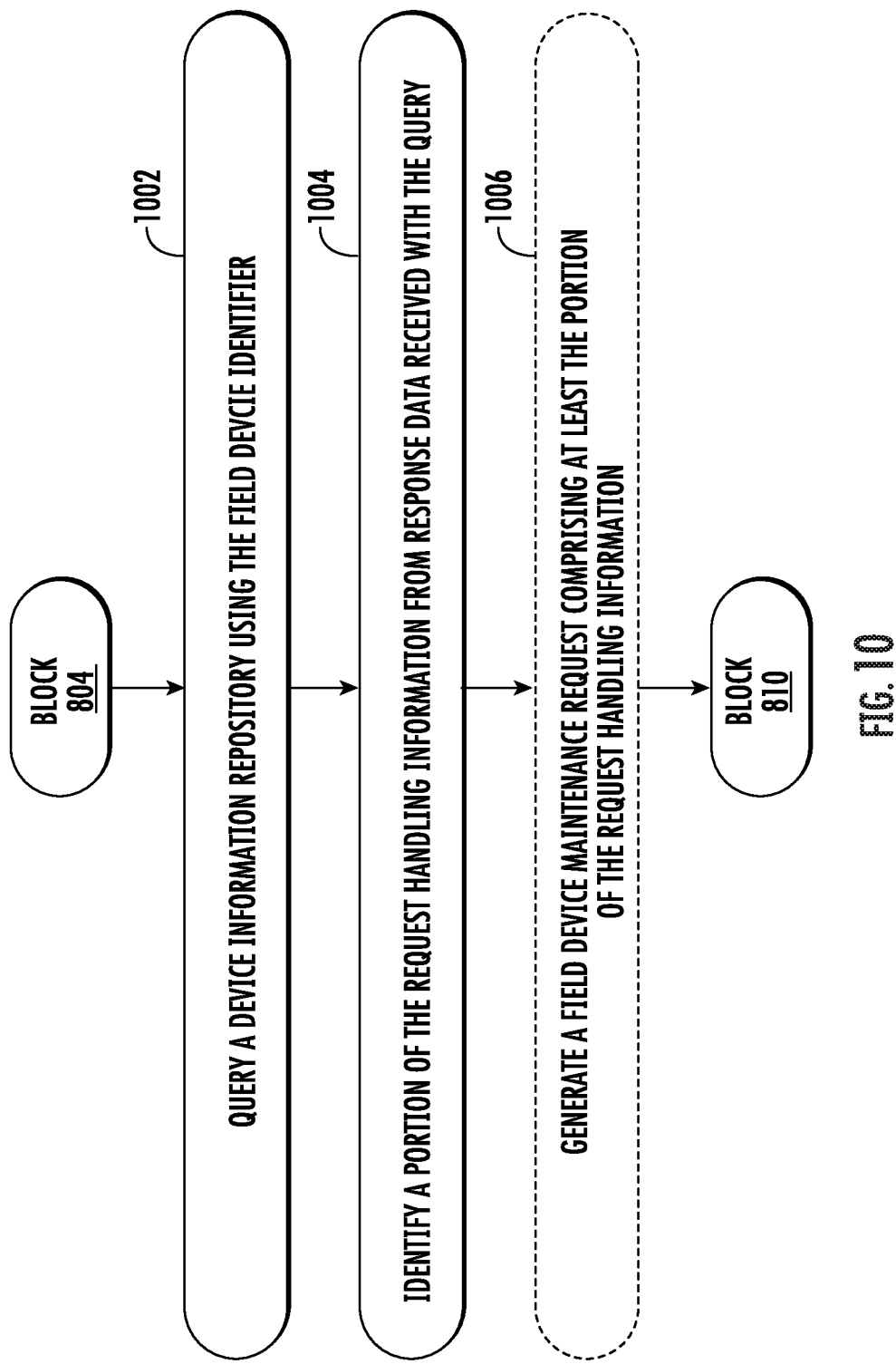

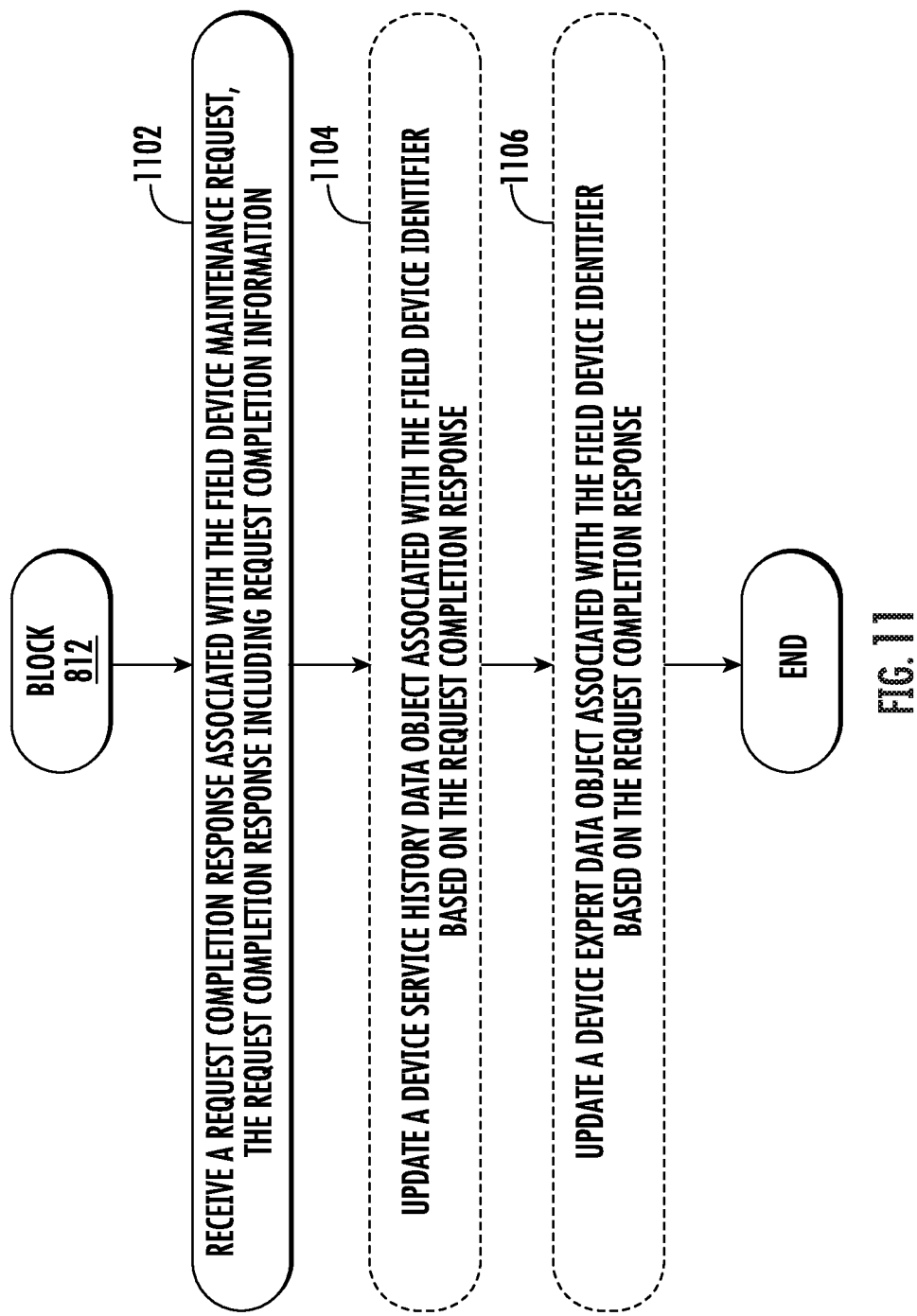

APPARATUS, METHOD, AND COMPUTER PROGRAM PRODUCT FOR FIELD DEVICE MAINTENANCE REQUEST MANAGEMENT

TECHNOLOGICAL FIELD

Embodiments of the present disclosure generally relate to field device maintenance request management, and specifically, to apparatuses, methods, and computer program products for field device tagging and navigation for maintenance.

BACKGROUND

Conventionally, field devices are placed throughout an industrial worksite, plant, or other environment. When a field device requires maintenance or is otherwise malfunctioning, such that a field engineer must attend to the field device, the field engineer often does not have access to the exact location of the field device or other critical information regarding the field device or the environment of the field device. Applicant has discovered problems with current systems, methods, apparatuses, and computer program products for field device maintenance request management, and through applied effort, ingenuity, and innovation, Applicant has solved many of these identified problems by developing solutions that are embodied in the present disclosure, with many examples of such solutions described in detail below.

BRIEF SUMMARY

In general, embodiments of the present disclosure provided herein include systems, methods, apparatuses and computer program products for field device maintenance request management. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an apparatus for field device maintenance request management is provided. In at least one example embodiment, the apparatus includes at least one processor and at least one memory. The at least one memory includes computer-coded instructions stored thereon. The computer-coded instructions, in execution with the at least one processor, are configured to cause the apparatus to receive, from a control system, a field device maintenance request associated with a field device. The computer-coded instructions are further configured to cause the apparatus to extract request handling information from the field device maintenance request. The computer-coded instructions are further configured to cause the apparatus to render, to a display, a request analysis interface comprising a request selection interface element associated with the field device maintenance request, the request selection interface element rendered based on at least a portion of the request handling information. The computer-coded instructions are further configured to cause the apparatus to receive user interaction data associated with the request analysis interface. The computer-coded instructions are further configured to parse the user interaction data to determine the user interaction data indicates selection of the request selection interface element associated with the field device maintenance request. The computer-coded instructions are further configured to cause the apparatus to determine a user location. The computer-coded instructions are further configured to cause the apparatus to generate a device navigation path from the user location to a field device location data object. The computer-coded instructions are further configured to cause the apparatus to render, to the display, a navigation interface comprising the device navigation path.

In some example embodiments of the apparatus, the field device maintenance request is one of a plurality of field device maintenance requests, and the apparatus is configured to render, to the display, the request analysis interface comprising an additional request interface element for each additional field device maintenance request in the plurality of field device maintenance requests.

In some example embodiments of the apparatus, the request handling information comprises one or more of (1) an environmental condition data object, (2) a request priority identifier, (3) a request type identifier, (4) a request description data, (5) device identification data, (6) a device expert data object, (7) a device service history data object, or (8) the field device location data object. In some such example embodiments of the apparatus, the request selection interface element is rendered comprising a request information interface element set, each request information interface element in the request information interface element set associated with a portion of the request handling information. Additionally or alternatively, in some such example embodiments of the apparatus, the request selection interface element comprises at least one interface element comprising at least one visual property configured based on a portion of the request handling information.

In some example embodiments of the apparatus, the apparatus is further configured to render, to the display, in response to the determination the user interaction data indicates selection of the request selection interface element, a selected request detail interface associated with the navigation interface, where the selected request detail interface comprises at least one interface element representing at least a portion of the request handling information.

In some example embodiments of the apparatus, the apparatus if further configured to render a request completion interface comprising a completion interface element set configured to receive request completion information in response to user interaction with the interface elements of the completion interface element set; receive completion user interaction data associated with the request completion interface; parse the completion user interaction data to determine the completion user interaction data indicates submission of the request completion information; and transmit, to the control system, a request completion response associated with the field device maintenance request, the request completion response comprising the request completion information, wherein the request completion response is configured to cause the control system to include the request completion information in a device service history data object associated with the field device.

In accordance with another aspect of the present disclosure, a computer-implemented method for field device maintenance request management is provided. In at least one example embodiment of the computer-implemented method, the computer-implemented method includes receiving, from a control system, a field device maintenance request associated with a field device. The example computer-implemented method further includes extracting request handling information from the field device maintenance request. The example computer-implemented method further includes rendering, to a display, a request analysis interface comprising a request selection interface element associated with the field device maintenance request, the request selection interface element rendered based on at least a portion of the request handling information. The example computer-implemented method further includes receiving user interaction data associated with the request analysis interface. The example computer-implemented method further includes parsing the user interaction data to determine the user interaction data indicates selection of the request selection interface element associated with the field device maintenance request. The example computer-implemented method further includes determining a user location. The example computer-implemented method further includes generating a device navigation path from the user location to a field device location data object. The example computer-implemented method further includes rendering, to the display, a navigation interface comprising the device navigation path.

In some example embodiments of the computer-implemented method, the field device maintenance request is one of a plurality of field device maintenance requests, and rendering the request analysis interface further comprises rendering, to the display, the request analysis interface comprising an additional request interface element for each additional field device maintenance request in the plurality of field device maintenance requests.

In some example embodiments of the computer-implemented method, the request handling information comprises one or more of (1) an environmental condition data object, (2) a request priority identifier, (3) a request type identifier, (4) a request description data, (5) device identification data, (6) a device expert data object, (7) a device service history data object, or (8) the field device location data object. In some such example embodiments of the computer-implemented method, the request selection interface element is rendered comprising a request information interface element set, each request information interface element in the request information interface element set associated with a portion of the request handling information. Alternatively or additionally, in some such example embodiments of the computer-implemented method, the request selection interface element comprises at least one interface element comprising at least one visual property configured based on a portion of the request handling information.

In some example embodiments of the computer-implemented method, the method further comprises rendering, to the display, in response to the determination the user interaction data indicates selection of the request selection interface element, a selected request detail interface associated with the navigation interface, where the selected request detail interface comprises at least one interface element representing at least a portion of the request handling information.

In some example embodiments of the computer-implemented method, the method further comprises rendering a request completion interface comprising a completion interface element set configured to receive request completion information in response to user interaction with the interface elements of the completion interface element set; receiving completion user interaction data associated with the request completion interface; parsing the completion user interaction data to determine the completion user interaction data indicates submission of the request completion information; and transmitting, to the control system, a request completion response associated with the field device maintenance request, the request completion response comprising the request completion information, wherein the request completion response is configured for causing the control system to include the request completion information in a device service history data object associated with the field device.

In accordance with another aspect of the present disclosure, a computer program product for field device maintenance request management is provided. In at least one example embodiment of the computer program product, the computer program product includes at least one non-transitory computer-readable computer storage medium having computer program instructions thereon. The computer program instructions, in execution with at least one processor, are configured to receive, from a control system, a field device maintenance request associated with a field device. The example computer program product is further configured, in execution of the computer program instructions via the at least one processor, extract request handling information from the field device maintenance request. The example computer program product is further configured to render, to a display, a request analysis interface comprising a request selection interface element associated with the field device maintenance request, the request selection interface element rendered based on at least a portion of the request handling information. The example computer program product is further configured to receive user interaction data associated with the request analysis interface. The example computer program product is further configured to parse the user interaction data to determine the user interaction data indicates selection of the request selection interface element associated with the field device maintenance request. The example computer program product is further configured to determine a user location. The example computer program product is further configured to generate a device navigation path from the user location to a field device location data object. The example computer program product is further configured to render, to the display, a navigation interface comprising the device navigation path.

In some example embodiments of the computer program product, the field device maintenance request is one of a plurality of field device maintenance requests, and wherein the computer program product is configured to render, to the display, the request analysis interface comprising an additional request interface element for each additional field device maintenance request in the plurality of field device maintenance requests.

In some example embodiments of the computer program product, the request handling information comprises one or more of (1) an environmental condition data object, (2) a request priority identifier, (3) a request type identifier, (4) a request description data, (5) device identification data, (6) a device expert data object, (7) a device service history data object, or (8) the field device location data object. In some such example embodiments of the computer program product, the request selection interface element is rendered comprising a request information interface element set, each request information interface element in the request information interface element set associated with a portion of the request handling information. Additionally or alternatively, in some example embodiments of the computer program product, the request selection interface element comprises at least one interface element comprising at least one visual property configured based on a portion of the request handling information.

In some example embodiments of the computer program product, the computer program product is further configured to render, to the display, in response to the determination the user interaction data indicates selection of the request selection interface element, a selected request detail interface associated with the navigation interface, where the selected request detail interface comprises at least one interface element representing at least a portion of the request handling information.

In some example embodiments of the computer program product, the computer program product is further configured to render a request completion interface comprising a completion interface element set configured to receive request completion information in response to user interaction with the interface elements of the completion interface element set; receive completion user interaction data associated with the request completion interface; parse the completion user interaction data to determine the completion user interaction data indicates submission of the request completion information; and transmit, to the control system, a request completion response associated with the field device maintenance request, the request completion response comprising the request completion information, wherein the request completion response is configured to cause the control system to include the request completion information in a device service history data object associated with the field device.

In accordance with another aspect of the present disclosure, yet another apparatus for field device maintenance request management is provided. In at least one example embodiment of the other apparatus, the other apparatus includes at least one processor and at least one memory. The at least one memory stores computer-coded instructions thereon. The computer-coded instructions configured to, in execution with the at least one processor, configure the apparatus to retrieve field device monitoring data correlated with a field device identifier associated with a field device. The example apparatus is further configured to render, to a display, a device monitoring interface representing the field device monitoring data correlated with the field device identifier. The example apparatus is further configured to identify the field device monitoring data indicates the field device is associated with deficient operations. The example apparatus is further configured to generate a field device maintenance request associated with the field device identifier. The example apparatus is further configured to identify at least one client device associated with the field device identifier. The example apparatus is further configured to transmit the field device maintenance request to the at least one client device.

In some example embodiments of the other apparatus, the apparatus is configured to render a device monitoring interface set comprising at least the device monitoring interface representing the field device monitoring data associated with the field device correlated to the field device identifier, and a second device monitoring interface representing second device monitoring data correlated with a second field device identifier associated with a second field device.

In some example embodiments of the other apparatus, to identify the field device monitoring data indicates the field device is associated with deficient operations, the apparatus is configured to determine at least a portion of the field device monitoring data is outside of a normal operating zone.

In some example embodiments of the other apparatus, to identify the field device monitoring data indicates the field device is associated with deficient operations, the apparatus is configured to receive user interaction data indicating a request to transmit the field device maintenance request associated with the field device identifier. In some such example embodiments of the other apparatus, the apparatus is further configured to parse the user interaction data to identify request handling information associated with the field device identifier, where the field device maintenance request comprises the request handling information.

In some example embodiments of the other apparatus, the field device maintenance request comprises request handling information, and the apparatus is further configured to query a device information repository using the field device identifier; and identify a portion of the request handling information from response data received associated with the query.

In some example embodiments of the other apparatus, the field device maintenance request comprises one or more of (1) an environmental condition data object associated with a field device location data object correlated to the field device identifier, (2) a request priority identifier, (3) a request type identifier, (4) request description data, (5) device identification data, (6) device expert data, or (7) device service history data object.

In some example embodiments of the other apparatus, the apparatus is further configured to receive a request completion response associated with the field device maintenance request, the request completion response comprising request completion information; and update at least a device service history data object or device expert data associated with the field device identifier based on the request completion response.

In some example embodiments of the other apparatus, the apparatus is further configured to set an operational mode of the field device to a servicing mode indicating servicing of the field device is requested. In some such example embodiments of the other apparatus, the apparatus is further configured to receive a request completion response associated with the field device maintenance request; and set the operational mode of the field device to a normal operation mode indicating servicing of the field device is complete. Additionally or alternatively, in some such embodiments of the other apparatus, setting the operational mode of the field device causes the field device to activate a location assistance indication component, wherein the location assistance indication component comprises a light configured to blink while in the servicing mode.

In accordance with another aspect of the present disclosure, yet another computer-implemented method for field device maintenance request management is provided. In at least one example embodiment of the other computer-implemented method, the method includes retrieving field device monitoring data correlated with a field device identifier associated with a field device. The other example computer-implemented method further includes rendering, to a display, a device monitoring interface representing the field device monitoring data correlated with the field device identifier. The other example computer-implemented method further includes identifying the field device monitoring data indicates the field device is associated with deficient operations. The other example computer-implemented method further includes generating a field device maintenance request associated with the field device identifier. The other example computer-implemented method further includes identifying at least one client device associated with the field device identifier. The other example computer-implemented method further includes transmitting the field device maintenance request to the at least one client device.

In some example embodiments of the other computer-implemented method, rendering the device monitoring interface includes rendering a device monitoring interface set comprising at least the device monitoring interface representing the field device monitoring data associated with the field device correlated to the field device identifier, and a second device monitoring interface representing second device monitoring data correlated with a second field device identifier associated with a second field device.

In some example embodiments of the other computer-implemented method, identifying the field device monitoring data indicates the field device is associated with deficient operations includes determining at least a portion of the field device monitoring data is outside of a normal operating zone.

In some example embodiments of the other computer-implemented method, identifying the field device monitoring data indicates the field device is associated with deficient operations includes receiving user interaction data indicating a request to transmit the field device maintenance request associated with the field device identifier.

In some example embodiments of the other computer-implemented method, the computer-implemented method further includes parsing the user interaction data to identify request handling information associated with the field device identifier, where the field device maintenance request comprises the request handling information.

In some example embodiments of the other computer-implemented method, the field device maintenance request comprises request handling information, and the method further includes querying a device information repository using the field device identifier; and identifying a portion of the request handling information from response data received associated with the query.

In some example embodiments of the other computer-implemented method, the field device maintenance request comprises one or more of (1) an environmental condition data object associated with a field device location data object correlated to the field device identifier, (2) a request priority identifier, (3) a request type identifier, (4) request description data, (5) device identification data, (6) device expert data, or (7) device service history data object.

In some example embodiments of the other computer-implemented method, the computer-implemented method further includes receiving a request completion response associated with the field device maintenance request, the request completion response comprising request completion information; and updating at least a device service history data object or device expert data associated with the field device identifier based on the request completion response.

In some example embodiments of the other computer-implemented method, the computer-implemented method further includes setting an operational mode of the field device to a servicing mode indicating servicing of the field device is requested. In some such embodiments of the computer-implemented method, the method further includes receiving a request completion response associated with the field device maintenance request; and setting the operational mode of the field device to a normal operation mode indicating servicing of the field device is complete. Additionally or alternatively, in some such example embodiments of the other computer-implemented method, setting the operational mode of the field device causes the field device to activate a location assistance indication component, where the location assistance indication component comprises a light configured to blink while in the servicing mode.

In accordance with another aspect of the disclosure, yet another computer program product for field device maintenance request management is provided. In at least one example embodiment of the other computer program product, the computer program product includes at least one non-transitory computer-readable storage medium having computer program instructions thereon. The computer program instructions, in execution with a processor, configured to retrieve field device monitoring data correlated with a field device identifier associated with a field device. The example other computer program product is further configured, in execution of the computer program instructions via the at least one processor, to render, to a display, a device monitoring interface representing the field device monitoring data correlated with the field device identifier. The example other computer program product is further configured to identify the field device monitoring data indicates the field device is associated with deficient operations. The example other computer program product is further configured to generate a field device maintenance request associated with the field device identifier. The example other computer program product is further configured to identify at least one client device associated with the field device identifier. The example other computer program product is further configured to transmit the field device maintenance request to the at least one client device.

In some example embodiments of the other computer program product, the computer program product is configured to render a device monitoring interface set comprising at least the device monitoring interface representing the field device monitoring data associated with the field device correlated to the field device identifier, and a second device monitoring interface representing second device monitoring data correlated with a second field device identifier associated with a second field device.

In some example embodiments of the other computer program product, to identify the field device monitoring data indicates the field device is associated with deficient operations, the computer program product is configured to determine at least a portion of the field device monitoring data is outside of a normal operating zone.

In some example embodiments of the other computer program product, to identify the field device monitoring data indicates the field device is associated with deficient operations, the computer program product is configured to receive user interaction data indicating a request to transmit the field device maintenance request associated with the field device identifier. In some such example embodiments of the other computer program product, the computer program product is further configured to parse the user interaction data to identify request handling information associated with the field device identifier, where the field device maintenance request comprises the request handling information. In some example embodiments of the other computer program product, the field device maintenance request comprises request handling information, and the computer program product is further configured to query a device information repository using the field device identifier; and identify a portion of the request handling information from response data received associated with the query.

In some example embodiments of the other computer program product, the field device maintenance request comprises one or more of (1) an environmental condition data object associated with a field device location data object correlated to the field device identifier, (2) a request priority identifier, (3) a request type identifier, (4) request description data, (5) device identification data, (6) device expert data, or (7) device service history data object.

In some example embodiments of the other computer program product, the computer program product is further configured to receive a request completion response associated with the field device maintenance request, the request completion response comprising request completion information; and update at least a device service history data object or device expert data associated with the field device identifier based on the request completion response.

In some example embodiments of the other computer program product, the computer program product is further configured to set an operational mode of the field device to a servicing mode indicating servicing of the field device is requested. In some such example embodiments of the other computer program product, the computer program product is further configured to receive a request completion response associated with the field device maintenance request; and set the operational mode of the field device to a normal operation mode indicating servicing of the field device is complete. Additionally or alternatively, in some such example embodiments of the other computer program product, setting the operational mode of the field device causes the field device to activate a location assistance indication component, wherein the location assistance indication component comprises a light configured to blink while in the servicing mode.

It should be appreciated that, in some embodiments, an apparatus may be provided including means for performing any of the computer-implemented methods described herein. Similarly, a computer program product may include program code instructions, on one or more non-transitory computer-readable storage medium, for performing any of the computer-implemented methods described herein.

BRIEF DESCRIPTION OF THE DRAWINGS

Figure 1:
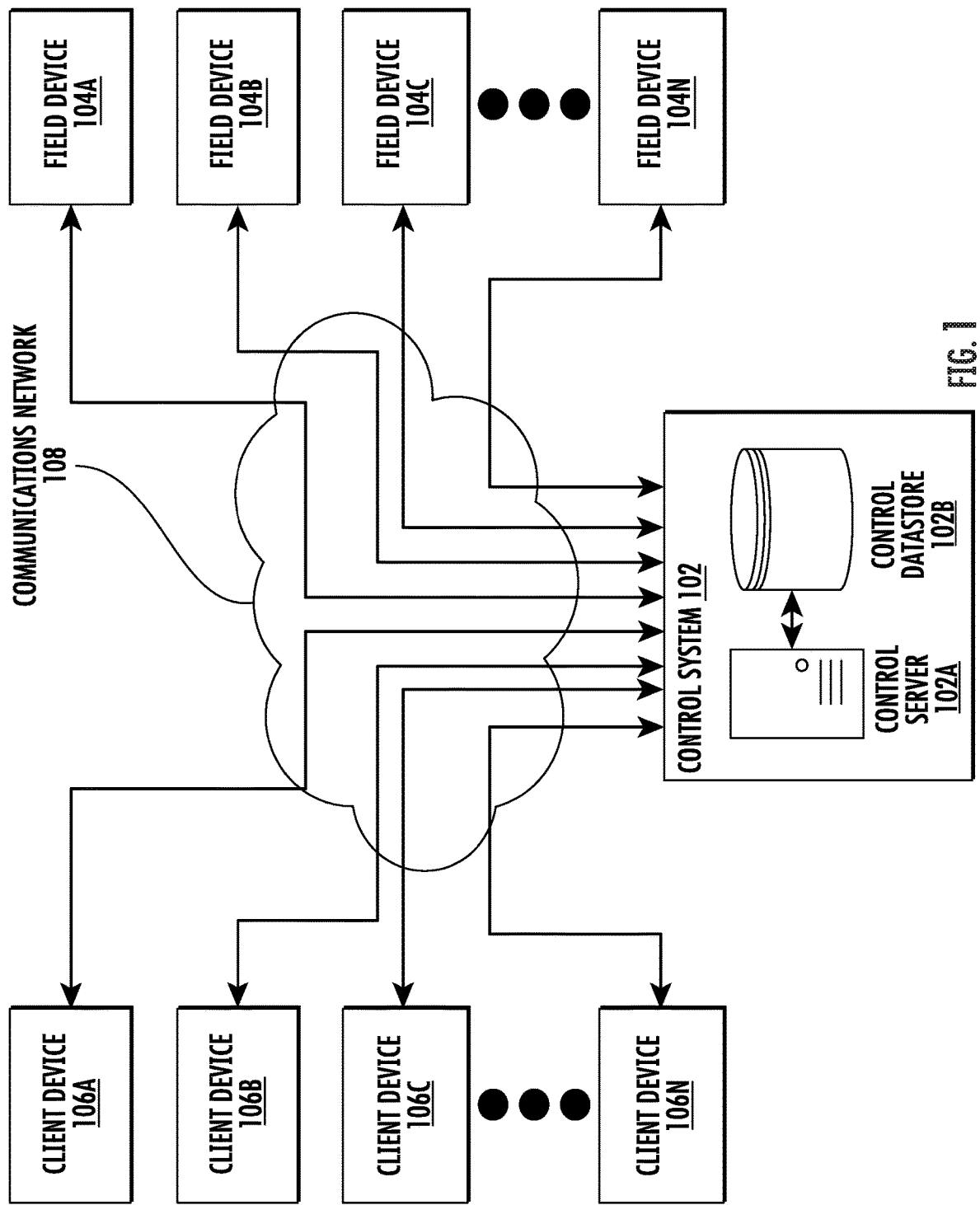
Figure 2:
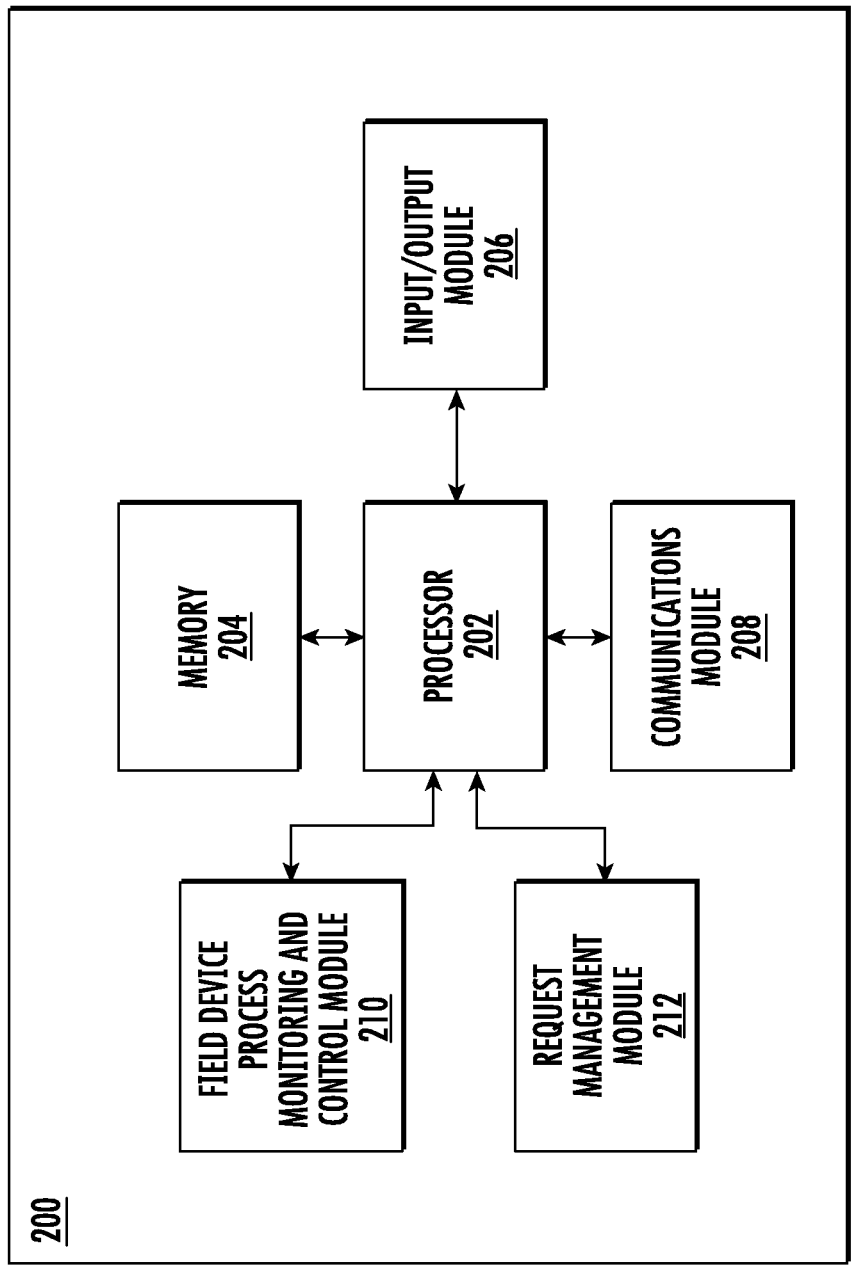
Figure 3:
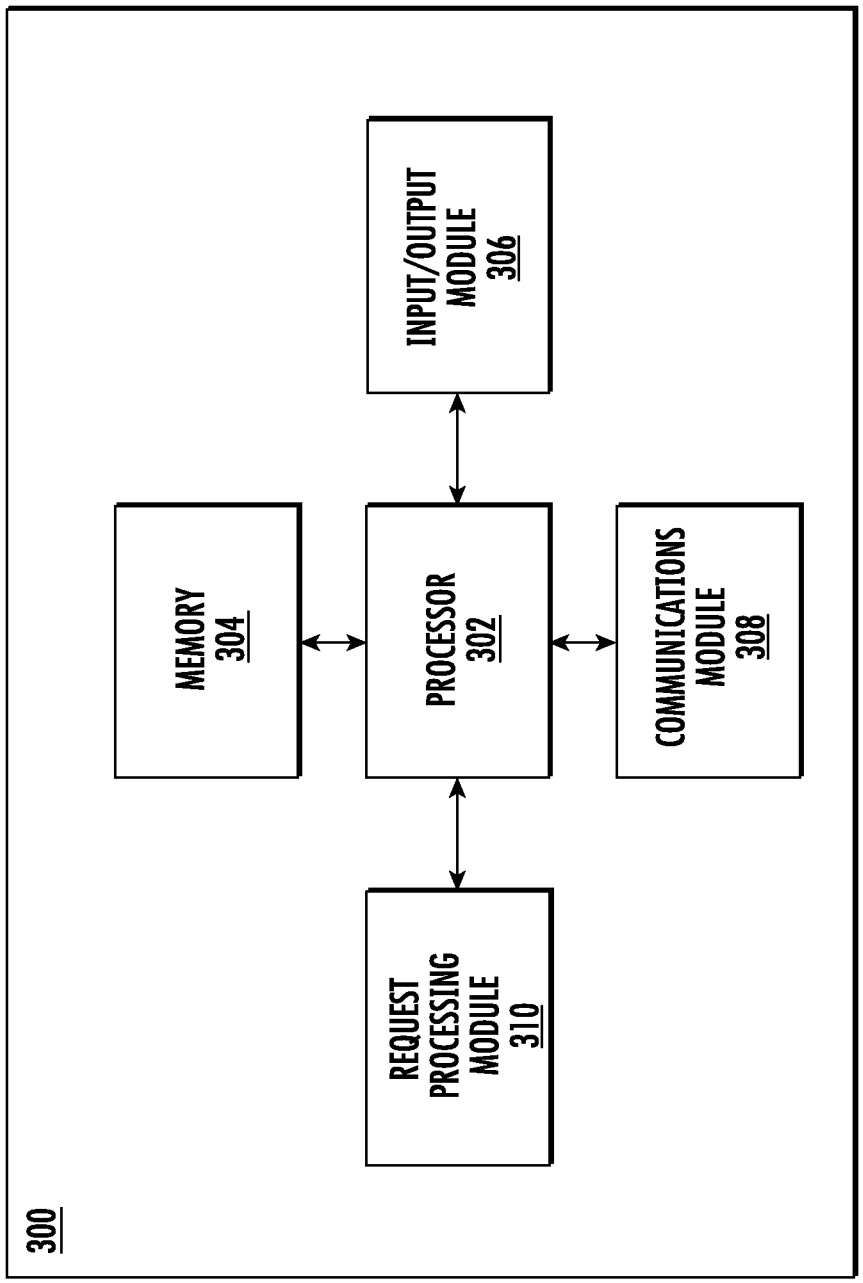
Figure 4:
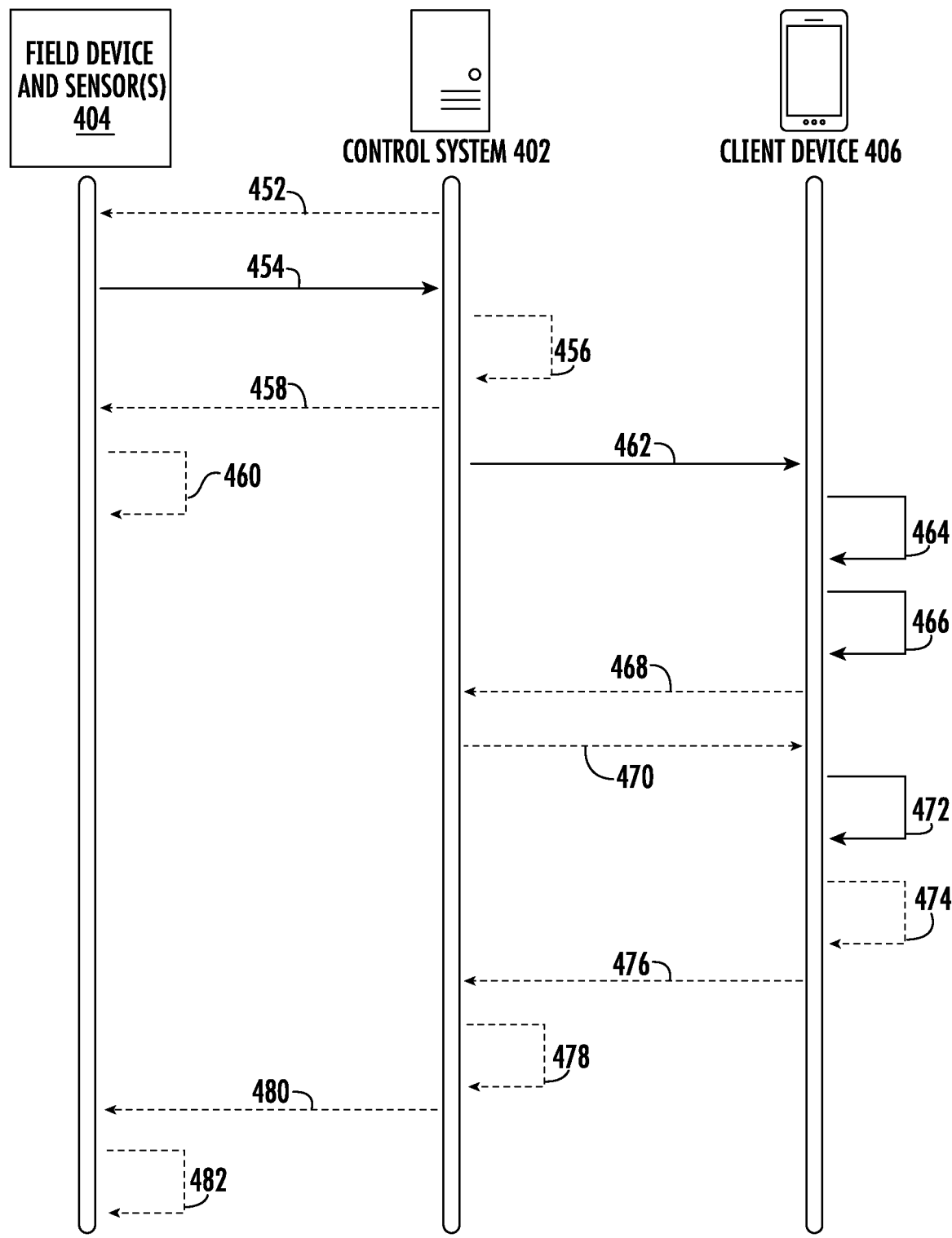
Figure 5:
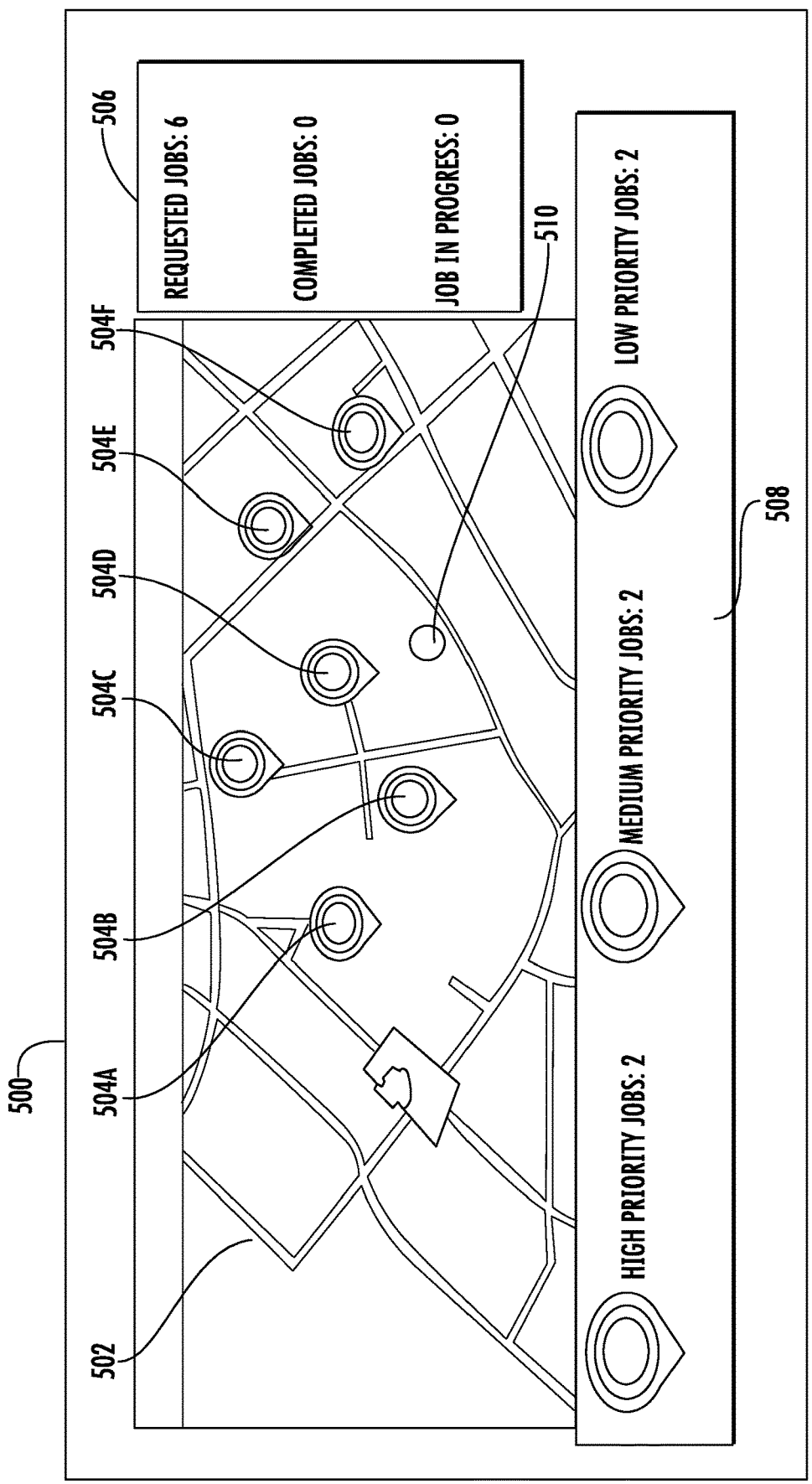
Figure 6:
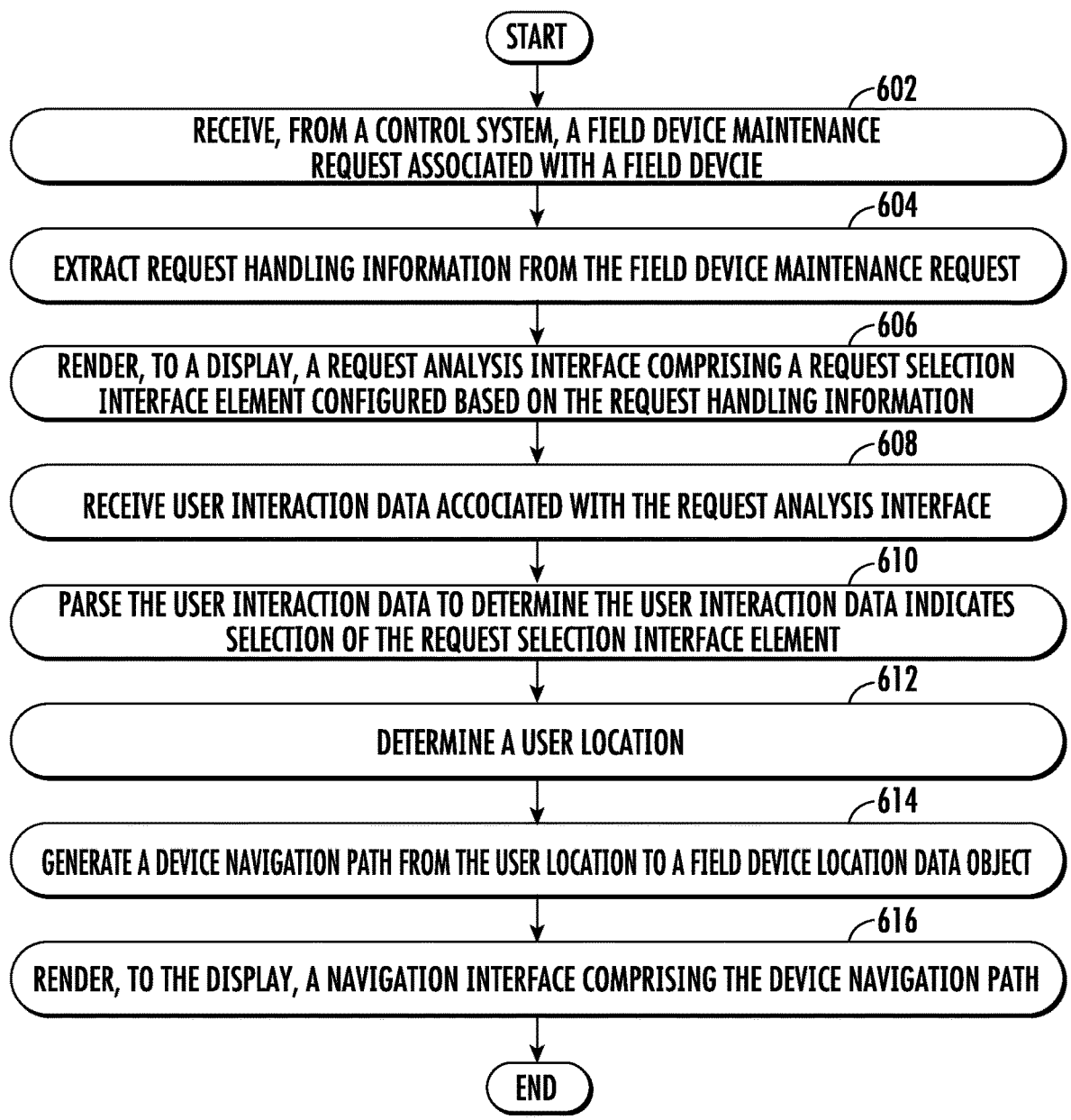
Figure 7:
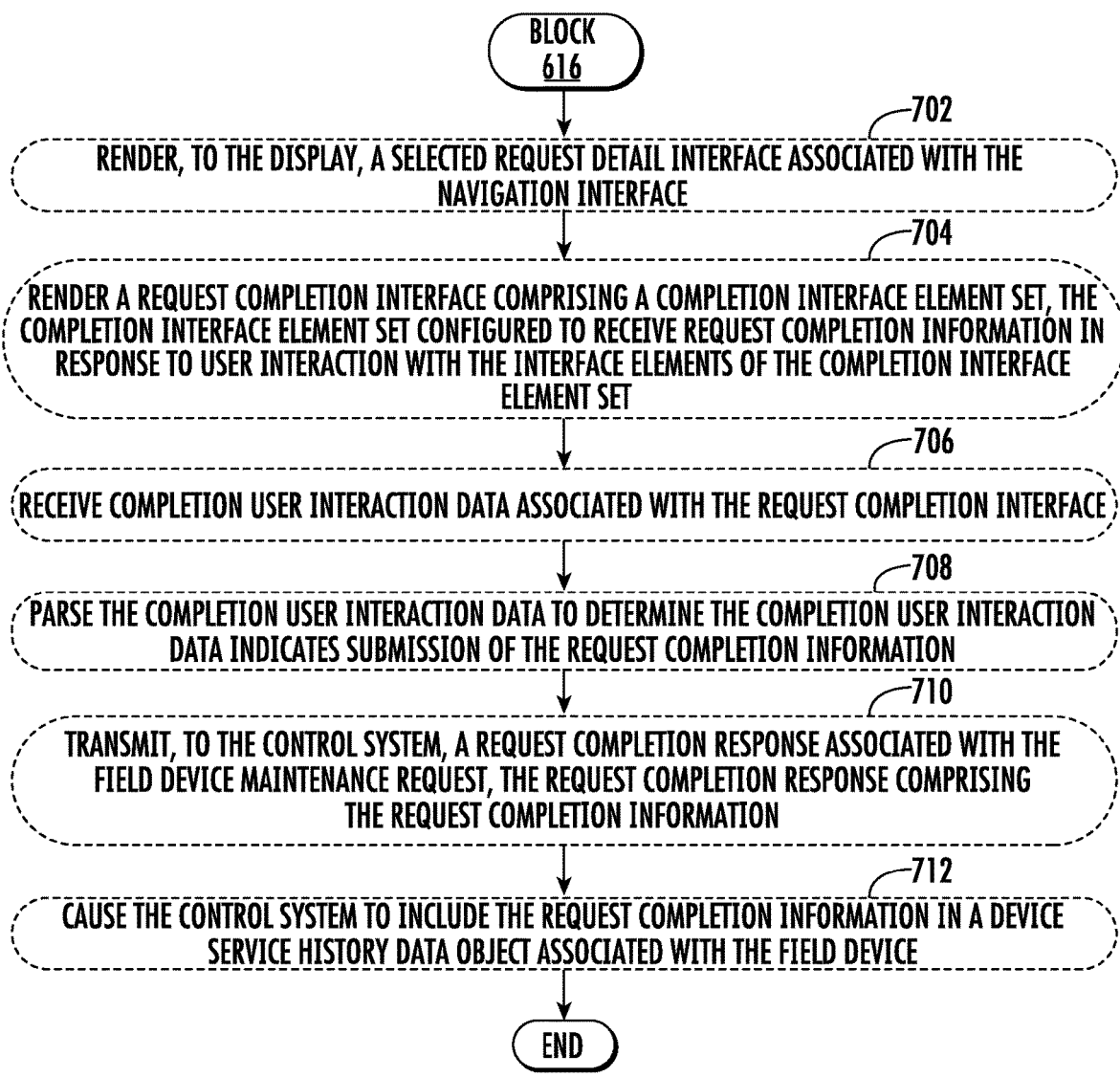

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates a block diagram of an example apparatus that may be specially configured in accordance with an example embodiment of the present disclosure;

FIG. 4 illustrates an example data flow of an example system in accordance with an example embodiment of the present disclosure;

FIG. 5 illustrates an example request analysis interface in accordance with an example embodiment of the present disclosure;

FIGS. 6-7 illustrate example flowcharts including operations for field device maintenance request management, to be performed by a specially configured client device in accordance with an example embodiment of the present disclosure; and FIGS. 8-11 illustrate example flowcharts including operations for field device maintenance request management, to be performed by a control system in accordance with an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In some contexts, an industrial plant, worksite, or other field includes several field devices that perform various operations that ensure the plant continues operations. It is common for a field device to require maintenance or other attention, and as the number of field devices increases, the likelihood that at least one field device requires maintenance continues to increase. The field devices may be associated with a control system that monitors the operations of each field device and/or associated data, such as environment data associated with each of the field devices. To monitor the field devices, the control system may include one or more sensors for monitoring one or more aspects of the field device and/or environment. Through the signals captured by the various sensors, the control system may detect faults associated with the various field devices (e.g., when particular signals indicate that captured signals are not within an expected operating range for a certain aspect of the field device).

The control system may include or be associated with a central interface, such as a human-machine interface (HMI), that includes the various monitored aspects of the various field devices. An operator may utilize the HMI to monitor the field devices, and may detect faults associated with one or more field devices based on the data included in the HMI. Often, the operator will function as a coordinator for detecting faults and prompting one or more field engineers to perform maintenance required to address the detected faults.

In this regard, conventionally, the operator may directly inform one or more field engineers of the detected fault and information about the faulty field device. Even after such communications from the operator, the field engineer may not know the exact location(s) of the fault device(s), especially if the operator does not know the exact location(s) of the fault device(s) or cannot effectively communicate the exact location(s) to the field engineer. Such inefficiencies may lead to wasted resources as a field engineer may be delayed in attending to the faulty field device(s). In other circumstances, due to not knowing the exact location of a faulty device, the field engineer may alter a working field device instead of the faulty device. Altering the working field device may lead to decreased productivity for the plant, worksite, or other field, and in a circumstance where the working field device is critical, may lead to a complete shutdown an significant production loss across an entire field.

Such circumstances are exacerbated by several technical and social circumstances. Often, a field engineer that is untrained or new to a job or particular field is also unfamiliar with the locations and identities of field devices throughout a plant. Even if a field engineer is experienced, previous maintenance actions performed by another field engineer may make it confusing, difficult, or impossible for the field engineer to identify a faulty field device accurately or in an efficient manner. Further, in some environments a plurality of identical field devices are located within a small proximity, and even if such field devices are marked (e.g., with tags) for differentiation, a field engineer may be unable to determine the identity of the marking, for example due to environment conditions wearing down the tag of the field device, or otherwise fail to distinguish between a faulty field device in close proximity to a working field device.

Various embodiments of the present disclosure are directed to apparatuses, methods, and computer program products for improved field device maintenance request management. In this regard, the various embodiments enable the provision of detailed information regarding a faulty field device from a control system, for example associated with an operator, to a client device, for example associated with a field engineer. The various embodiments further enable field device tagging and navigation, such that a field engineer may efficiently, effectively, and safely navigate to and identify a faulty field device for maintenance purposes.

In at least one aspect of the embodiments, a control system, for example embodied by an apparatus configured in accordance with at least one embodiment described herein, may retrieve field device monitoring data and, automatically or through user interaction of a user of the control system, trigger a maintenance alarm when the field device monitoring data indicates a corresponding field device is faulty or otherwise problematic such that the field device requires maintenance. Further in this regard, the control system communicates, or otherwise generates and/or transmits, a field device maintenance request to a specially configured client device, such as an apparatus configured in accordance with at least one embodiment described herein, where the client device is associated with a user that may perform maintenance on the field device (in an example context, a field engineer associated with an industrial plant where the field device is located). The field device maintenance request includes various data object(s) and/or information, which may be provided by an operator and/or automatically identified from the control system, for use in displaying pending requests. The pending requests may be displayed based on and/or associated with particular information parsed or extracted from the field device maintenance request. A user, such as a field engineer, may provide user interaction for selecting a particular request, and in some embodiments, a device navigation path may be generated and/or provided to enable the user to navigate from a current user location to the location of a field device. Some embodiments may leverage connections with the field device to enable navigation to, and/or identification of, the field device, for example by configuring the field device for identification and/or obtaining information (e.g., location data) from the field device for use.

Embodiments enable further information to be rendered to various interfaces that enable efficient, accurate, and safe decision-making by a user of the improved client device, such as a field engineer. For example, additional detailed information may be automatically detected and/or provided by an operator for displaying to the user, including, and without limitation, historical information, environment safety information, device identification information, device expert information, or any combination thereof. Such embodiments may further enable the user, such as a field engineer, to provide updated information to the control system to update information and/or data sets associated with one or more field devices.

In this regard, embodiments of the present disclosure address various technical inefficiencies and problems, as well as human inefficiencies, by providing specific technical solutions. Client devices often include displays that are too small to allow effective monitoring of several field devices. Embodiments nonetheless enable automatic detection, retrieval, and transmission of data for providing to a field engineer for use in identifying, navigating to, and/or otherwise performing field device maintenance. Such improvements reduce reliance on human operators by leveraging such automated processes. Further, the specific embodiments enable provision, such as by rendering, of specific data and corresponding interfaces that enable a user, such as a field engineer, to perform effective and efficient maintenance actions. In such circumstances, embodiments of the present disclosure reduce or prevent industrial plant downtime.

Example System Architecture

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview system configured for enabling field device maintenance request management in accordance with the present disclosure. A control system 102 may be configured to enable generation of field device maintenance requests comprising various information. The control system 102 may be in communication with field devices 104A-104N (collectively "field devices 104"), and/or associated devices such as sensors for monitoring the field devices 104. Additionally, the control system 102 may be configured to communicate with client devices 106A-106N (collectively "client devices 106").

The field devices 104 may be located throughout one or more fields. For example, in some embodiments, all field devices 104 are located in the same field (e.g., a particular industrial plant or worksite). The field devices 104 may include various instruments, computing systems, analog systems, circuitry, machines, and the like, located within the field to serve any of a number of purposes. Each of the field devices 104 may include or otherwise be associated with one or more sensors, each sensor used for providing data corresponding to particular aspects about the associated field device and/or otherwise used for providing environmental data associated with the associated field device. In other embodiments, it should be appreciated that the field devices 104 may be located throughout a plurality of fields, where a subset of the field devices 104 may be located within each field.

The client devices 106 may be any computing device or computing hardware configured to communicate with the control system 102. Any of the client devices 106 may be embodied, without limitation, by a smart phone, tablet computer, laptop computer, wearable, personal computer, enterprise computer, and the like. In some embodiments, the client device may include specially configured hardware, software, or a combination thereof to perform specific functionality described herein.

In some embodiments, any of the client devices 106 may execute an application to interact with the control system 102. Such applications are typically designed to execute on a client device, and may be executed as an "app" via a mobile client device such as a smartphone or tablet. The application may execute on an operating system configured for execution on the client device, where such operating systems typically provide frameworks to allow applications to communicate with other hardware and software components of the client device, including, in some contexts, with other applications executed via the client device. The operating systems may provide location services hardware and/or functionality, wired and/or wireless network interface hardware and/or functionality, data processing hardware and/or functionality, data storage hardware and/or functionality, and the like. In some embodiments, an application executed via a client device may utilize one or more application programming interfaces (APIs) provided by the operating system of the client device. Additionally or alternatively, in some embodiments, one or more of the client devices 106 may interact with the control system via a web browser. For example, one or more of the client devices 106 may be configured to execute a web browser application for accessing functionality from the control system 102 via a web service. As yet another example, the client devices 106 may include various hardware or firmware designed to interface with the control system 102.

The control system 102 may be configured to perform various functionality associated with field device maintenance request management. In some embodiments, and as illustrated, the control system includes at least control server 102A and control datastore 102B. The control server 102A may be configured to communicate with control datastore 102B, for example to retrieve and/or store various information associated with field device(s) 104 and/or client device (s) 106. In other embodiments, the control datastore 102B may be embodied as a sub-component of control server 102A, for example as one or more memory devices.

The control server 102A may be embodied as a computer or plurality of computers. The control server 102A may provide for receiving and/or transmission of electronic sources from various sources, including but not necessarily limited to client devices 106 and/or field devices 104. For example, the control server 102A may be operable to retrieve field device monitoring data associated with field devices 104, and generate and/or transmit field device maintenance request(s) associated with the field device monitoring data. In some embodiments, the control server 102A is operable to communicate with one or more components of any of the field devices 104, including, without limitation, locations services hardware and/or other location assistance indication component(s). Additionally or alternatively, in some embodiments, the control server 102A may be operable to communicate with one or more sensor device(s) associated with one or more of the field devices 104. For example, the sensor device(s) may be configured to detect and/or otherwise receive field device monitoring data associated with a particular aspect of a field device, or the environment associated with a particular field device.

The control datastore 102B may be embodied as a data storage device, such as a network attached storage (NAS) device or set of devices, or as one or more separate database server(s) or database device(s). For example, the control datastore 102B includes information and/or data received, retrieved, or otherwise accessed by the control server 102A and stored to facilitate operation of the control system 102. For example, the control datastore 102B may include, without limitation, user account data (including user account credentials and/or user identification information), client device identification data, field device communication data (e.g., field device identifier information, IP address information, and/or the like to enable communications over one or more communications networks), field device monitoring data, field device operating data (e.g., representing normal operating zone(s) for one or more aspects of one or more field device(s)), device service history data, device expert data, and/or the like, or any combination thereof. It should be appreciated that the control database 102B may store the various information and/or data in any of a number of data formats. Additionally or alternatively, in some embodiments, any of a number of sub-datastores may be used to separate one or more data types.

The control system 102 may be configured to communicate with each of the client devices 106 and/or field devices 104 via a communications network 108. The communications network 108 may include any combination of one or more wired and/or wireless communication network including, for example and without limitation, a wired or wireless local area network (LAN), personal area network (PAN), metropolitan area network (MAN), wide area network (WAN), or the like, as well as hardware, software, and/or firmware for implementing the network (for example, network routers and the like). For example, the communications network 108 may include, in some contexts, a cellular telephone, an 802.11, 802.16, 802.20, and/or WiMax network. In some embodiments, the communications network 108 includes a public network, such as the Internet, a private network, such as an intranet, or any combination thereof. The communications network 108 may utilize any number of a variety of networking protocols now available or developed later, including, without limitation, TCP/IP based networking protocols. For instance, the networking protocol may be customized to suit the needs of the control system 102, field devices 104, and/or client devices 106. In some embodiments, the protocol includes and/or embodies a custom protocol of JSON, XML, or other structured data objects. In other embodiments, the protocol includes and/or embodies one or more custom unstructured data protocols.

In addition to transmitting and/or receiving requests and/or other communications, the control system 102, field devices 104, and/or client devices 106 may be configured to determine, parse, extract, and/or otherwise identify metadata associated with a received transmission, request, or other communication. For example, the control system may be configured to extract sender information, transmission sent timestamp information, and/or other information from transmissions received from any of the client devices 106 and/or field devices 104.

Example Apparatuses for Implementing Embodiments of the Present Disclosure

The control system 102 may be embodied by one or more computing systems, such as the apparatus 200 depicted in FIG. 2. The apparatus 200 may include a processor 202, a memory 204, an input/output module 206, a communications module 208, a field device process monitoring and control module 210, and a request management module 212. The apparatus may be configured, using one or more of the components 202, 204, 206, 208, 210, and/or 212, to execute the operations described herein.

Although the components are described with respect to functional limitations, it should be understood that the particular implementations necessarily include the use of particular hardware. It should also be understood that certain of the components described herein may include similar or common hardware. For example, two sets of components, for example two sets of circuitry or modules, may both leverage use of the same processor(s), network interface(s), storage medium(s), or the like to perform their associated functions, such that duplicate hardware is not required for each set of components. The use of the terms "circuitry" and "module" as used herein with respect to components of the apparatus 200 should therefore be understood to include particular hardware configured to perform the functions associated with the particular circuitry or module as described herein.

The term "circuitry" and "module" should be understood broadly to include hardware and, in some embodiments, software for configuring the hardware. For example, in some embodiments, "circuitry" or "module" may include processing circuitry, storage media, network interfaces, input/output devices, and the like. In some embodiments, other elements of the apparatus 200 may provide or supplement the functionality of another particular module. For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to generate field device maintenance request(s) associated with any of field devices 104 and to be transmitted to any of client devices 106 (shown in FIG. 1) to be processed by the client device and enable operations described herein for field device maintenance request management. The processor 202 ensures that data, such as field device monitoring data, retrieved associated with a particular field device is accurately associated with a field device maintenance request for display via one or more interfaces of a client device. Moreover, the processor 202 may be configured to synchronize and/or process responses data received from the client devices 106.

In some embodiments, the apparatus 200 may include input/output module 206 that may, in turn, be in communication with processor 202 to provide output to the user and, in some embodiments, to receive an indication of a user input. The input/output module 206 may comprise one or more user interface(s) (e.g., a device monitoring interface) and may include a display that may comprise the interface(s) rendered as a web user interface, an application interface, a client device, a backend system, or the like. In some embodiments, the input/output module 206 may also include a keyboard, a mouse, a joystick, a touch screen, touch areas, soft keys, a microphone, a speaker, or other input/output mechanisms. The processor 202 and/or input/output module 206 comprising the processor may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communication network. For example, the communications module 208 may include one or more network interface card(s), antenna(s), bus(es), switch(es), router(s), modem(s), and supporting hardware and/or software, or any other device suitable for enabling communications via one or more communication network(s). Additionally or alternatively, the communications module 208 may include circuitry for interacting with the antenna(s) and/or other hardware or software to cause transmission of signals via the antenna(s) or to handle receipt of signals received via the antenna(s).

The field device process monitoring and control module 210 includes hardware, software, or a combination thereof, configured to support a control system 102 in communications with one or more field device(s) and/or associated sensor(s). The field device process monitoring and control module 210 may utilize processing circuitry, such as the processor 202, to perform these actions. The field device process monitoring and control module 210 may retrieve field device monitoring data correlated with one or more field device(s). In some implementations, the field device process monitoring and control module 210 may communicate with one or more field device(s) and/or associated sensor(s) in real-time to retrieve the field device monitoring data. For example, in some implementations, the field device process monitoring and control module 210 may communicate with, or include, one or more sensor(s) configured to detect field device monitoring data associated with the environment of a field device. For example, the field device process monitoring and control module 210 may retrieve field device monitoring data from the one or more sensor(s) that indicates temperature, pressure, hazardous conditions (e.g., smoke/fire detectors, poisonous gas or other chemical detectors, and the like), or other sensors that may detect data that may be used to determine environmental conditions associated with a field device are outside a normal operating zone. Alternatively or additionally, in some implementations, the field device process monitoring and control module 210 may communicate with one or more repositories, such as a control datastore, to retrieve the field device monitoring data.

In some embodiments, additionally or alternatively to providing functionality associated with monitoring a field device set, the field device process monitoring and control module 210 includes hardware, software, or a combination thereof, for controlling various process parameters associated with one or more field device(s) of the field device set. For example, for each field device, the field device process monitoring and control module 210 may enable adjustment of one or more parameters controlling the functionality associated with field device monitoring data retrieved for that field device. It should be appreciated that the parameters associated with each field device may differ based on a field device type. In this regard, the field device process monitoring control module 210 may be configured to provide functionality associated with various field device type(s), and provide corresponding interfaces associated with a subset of that functionality (e.g., an interface for controlling one particular selected field device of a particular field device type).

Additionally or alternatively, in some embodiments, the field device process monitoring and control module 210 may include hardware, software, or a combination thereof, to interact with one or more components of one or more field device(s) upon determination the field device(s) are associated with deficient operations. For example, in some embodiments, the field device process monitoring and control module 210 may include hardware, software, or a combination thereof, to set an operational mode of a field device, for example between a servicing mode and a normal operation mode. Additionally or alternatively, the field device process monitoring and control module 210 may activate a location assistance indication component of the field device, for example a blinking light, strobe light, location services hardware, or other elements configured to identify and/or locate the field device. In some embodiments, the field device process monitoring and control module 210 may communicate one or more transmissions, such as one or more requests, to the field device(s) to set an operational mode, and/or to cause the field device to activate and/or deactivate one or more location assistance indication components and/or set an operational mode.

The field device process monitoring and control module 210 may further process retrieved field device monitoring data. In some embodiments, in at least one aspect, the field device process monitoring and control module 210 may include hardware, software, or a combination thereof, to process field device monitoring data for rendering. Alternatively or additionally, the field device process monitoring and control module 210 may be configured to determine field device monitoring data indicates a corresponding field device is associated with deficient operations, or otherwise faulty. In some such embodiments, the field device process monitoring and control module 210 may be configured to retrieve and/or otherwise identify normal operating data associated with at least a portion of retrieved field device monitoring data, and/or compare the normal operating data to the retrieved field device monitoring data to make such a determination. It should be appreciated that, in some embodiments, the field device process monitoring and control module 210 may include a separate processor, specially configured field programmable gate array (FPGA), or a specially programmed application specific integrated circuit (ASIC).

The request management module 212 includes hardware, software, or a combination thereof, configured to support a control system 102 in communication with one or more client device(s) 106. The request management module 212 may utilize processing circuitry, such as processor 202, to perform these actions. The request management module 212 may generate and/or transmit a field device maintenance request to one or more client devices in response to one or more determinations associated with the retrieved field device monitoring data. In some implementations, the request management module 212 includes software, hardware, or a combination thereof, to receive user interaction data parseable to identify request handling information for including in a field device managing request.

Additionally or alternatively, the request management module 212 may automatically identify at least a portion of request handling information associated with a field device, for example linked to a field device identifier corresponding to the field device. The automatically identified request handling information may include information retrieved from one or more datastores, such as a control datastore, associated with one or more field devices determined to be associated with deficient operations. The request handling information may include any combination of environment condition data, request priority data, request type data, request description data, field device identification data, device expert data, device service history data, field device location data, and/or the like. In some embodiments, a portion of the request handling information is identified in response to user interaction and a second portion of the request handling information is identified automatically. For example, the first portion of the request handling information may include request type data (e.g., an indicator and/or text indicating a class of the determined problem), request description data (e.g., a description of the problem requiring maintenance submitted by a user), request priority data (e.g., a numerical or categorical identifier indicating priority of the problem, as submitted by a user), field device identification data (e.g., a field device tag number or name submitted by a user), and/or any combination thereof. The second portion of request handling information, for example, may include device expert data (e.g., contact information and/or identification information associated with a field engineer that previously performed maintenance on the field device), device service history data (e.g., a log of maintenance actions performed on or associated with a field device), field device location information (e.g., GPS coordinates or latitude/longitude coordinates of the field device), and/or any combination thereof.

The request management module 212, in some embodiments, includes software, hardware, or a combination thereof to identify one or more client devices for which to transmit a field device maintenance request. For example, in some embodiments, the request management module 212 is configured to identify, based on a field device identifier corresponding with a field device determined to be associated with deficient operations, one or more user account identifiers. Each user account identifier may be associated with a user that services the field device corresponding to the field device identifier, and the request management module 212 may be configured to identify client device identifier(s) associated with the user account identifiers (for example, where client devices are accessing the control system for an authenticated session associated with the user account corresponding to the user account identifier). For example, in some embodiments, each field device identifier may be linked, for example in one or more datastores, to one or more corresponding client device identifiers and/or user account identifiers. In other embodiments, the request management module 212 may be configured to maintain a list of information associated with client devices currently accessing the control system, for example during an authenticated session, such that the one or more client devices to receive the field device maintenance request may be identified from the list.

Additionally or alternatively, the request management module 212 may include hardware, software, or a combination thereof to receive and/or process response data received from a client device. For example, the request management module 212 may be configured to receive and/or process a request completion response from a client device. The request management module 212 may, based on information in the request completion response, store and/or update stored data associated with the field device for which maintenance was performed. For example, the request management module 212 may extract, parse, or identify user information and/or service information for use in updating device service history data and/or device expert data associated with a field device. It should be appreciated that, in some embodiments, the request management module 212 may include a separate processor, specially configured FPGA, or a specially programmed ASIC. It should also be appreciated that all or some of the information discussed herein can be based on data that is received, generated, and/or maintained by one or more components of the apparatus 200. In some embodiments, one or more In some embodiments, it should be appreciated that the one or more of the modules 202-212 may be combined. Alternatively or additionally, in some embodiments, one or more of the modules may perform some, or all, of the functionality described associated with another component. For example, in some embodiments, the modules 210 and 212 may be combined into a single module embodied in hardware, software, or a combination thereof. Similarly, in other embodiments, the modules 210, 212, and/or 202 may be combined such that processing circuitry is provided to perform the operations described above with respect to each of these modules.

One or more of the client devices 106 may be embodied by one or more computing systems, apparatuses, devices, or the like, for example apparatus 300 depicted in FIG. 3. As illustrated in FIG. 3, the apparatus 300 may include a processor 302, memory 304, input/output module 306, communications module 308, and request processing module 310. In some embodiments, one or more modules of the apparatus 300 may provide or supplement the functionality of other modules. For example, the processor 302 may provide processing functionality, the memory 304 may provide storage functionality, the input/output module 306 may provide user interface and/or rendering functionality, the communications module 208 may provide network interface functionality, and the like. As it relates to the operations described in the present disclosure, the functioning of the processor 302, the memory 304, the input/output module 306, and/or the communications module 308 may be similar to the similarly named components described above with respect to FIG. 2. For the sake of brevity, additional description of the mechanics and functionality associated with these components is omitted. Nonetheless, these device components, whether operating alone or together in any combination, provide the apparatus 300 to facilitate the communication of data between the apparatus 300 and one or more devices and/or systems, such as a control system 102 (as depicted in FIG. 1), over one or more communication network(s).

The request processing module 310 includes hardware, software, or a combination thereof, to configured to support any of the client devices 106 in communications with a control system. The request processing module 310 may utilize processing circuitry, such as the processor 302, to perform these actions. The request processing module 310 may be configured to receive a field device maintenance request and/or extract request handling information from the request. The request processing module 310 may be configured, using hardware, software, or a combination thereof, to process the extracted, parsed, and/or otherwise received data and/or information. For example, in some embodiments, the request processing module 310 is configured to determine a user location and/or generate a device navigation path from the user location to another location, such as a field device location associated with a field device location data object. Additionally or alternatively, the request processing module 310 is configured, utilizing hardware, software, or a combination thereof, to render one or more associated interfaces, including, without limitation, a request analysis interface, a selected request detail interface, and/or a navigation interface. In some embodiments, the request processing module 310 is configured to parse and/or otherwise process user interaction associated with the one or more interfaces, and/or perform one or more actions in response to the user interaction(s). Additionally or alternatively, in some embodiments, the request processing module 310 is configured in hardware, software, or a combination thereof, to generate a request completion response, for example based on received user interaction data, and transmit the response to a control system. It should be appreciated that, in some embodiments, the request processing module 310 may include a separate processor, specially configured FPGA, or a specially programmed ASIC. It should also be appreciated that all or some of the information discussed herein can be based on data that is received, generated, and/or maintained by one or more components of the apparatus 300.

It should also be appreciated that, in at least some embodiments, one or more of the modules 302-310 may be combined. Alternatively or additionally, in some embodiments, one or more of the modules may perform some, or all, of the functionality described associated with another component. For example, in some embodiments, the modules 302 and 310 may be combined such that processing circuitry is provided to perform the operations described above with respect to each of these modules.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware, and/or firmware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus' circuitry to produce a machine, such that the computer, processor, or other programmable circuitry that execute the code on the machine creates the means for implementing various functions, including those described herein.

The computing systems described herein can include client devices and server devices. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiments or of what may be claimed, but rather as description of features specific to particular embodiments of this disclosure. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described, and will be described below. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example System Data Flow

FIG. 4 illustrates an example data flow associated with an example system, in accordance with embodiments of the present disclosure. The example data flow provides various data processing and/or transmissions steps between a control system 402, field device and sensor(s) 404, and client device 406. It should be appreciated that, in some embodiments, the field device comprises no associated sensors, such that the control system 402 may receive data only from the field device itself. Yet in other embodiments, the field device may be associated with any number of sensors, such that control system 402 may additionally receive data from any of the sensor(s) directly or through communication with the field device. It should be appreciated that the control system 402 may be embodied by the apparatus 200, and the client device 406 may be embodied by the apparatus 300.

At optional step 452, the control system 402 may transmit one or more requests and/or information for receiving field device monitoring data associated with the field device and sensors 404. For example, in some embodiments at step 452, the control system 402 may request field device monitoring data from the field device and sensor(s) 404 in real-time. The control system 402 may be configured to identify the field device and associated sensor(s) 404 for monitoring based on a list of field devices for monitoring that is maintained by the control system 402. The list of field devices may be predetermined or maintained in real-time by the control system 402.

At step 454, the control system 402 may receive field device monitoring data from the field device and sensor(s) 404. The field device monitoring data may be associated with various aspects of the field device. In some embodiments, the field device monitoring data is received in response to a request transmitted by the control system 402, for example at step 452. Alternatively, in some embodiments, the control system 402 may constantly receive field device monitoring data from the field device and sensor(s) 404, for example without continuous and/or previous requesting.

At step 456, the control system 402 may utilize the field device monitoring data to perform one or more actions based on the field device monitoring data. In some embodiments, for example, the control system 402 may render a device monitoring interface comprising the field device monitoring data, and/or data derived therefrom. In some embodiments, the device monitoring interface may be configured to receive user interaction, for example user interaction representing a request to generate and transmit a field device maintenance request associated with a particular field device for which field device monitoring information has been received and rendered. Alternatively or additionally, in some embodiments, the control system 402 may perform one or more perform one or more determinations based on the received field device monitoring data. For example, the control system 402 may process the field device monitoring data to determine whether the field device is functioning normally, or whether the field device is associated with diminished functionality.

At optional step 458, the control system 402 may transmit information to the field device and sensor(s) 404 to set an operational mode associated with the field device to a servicing mode. In some embodiments, the control system 402 may transmit a request to the field device of the field device and sensor(s) 404 to cause the field device to be set to a servicing mode. In some embodiments, while in servicing mode, the field device may not operate and/or may not perform all operations performed by the field device while fully operational.

At optional step 460, the field device and sensor(s) 404 may activate at least one location assistance indication component associated with the field device. In some embodiments, the field device and sensor(s) 404 may activate the at least one location assistance indication component in response to an earlier received transmission, for example a request received at step 458. In some embodiments, the field device and sensor(s) 404 may activate one or more of location services hardware, one or more light emitting components, one or more displays, or the like. The activated location assistance indication components may be used to locate and/or identify the field device in servicing mode for maintenance.

At step 462, the control device 402 may generate a field device maintenance request and/or transmit the field device maintenance request to a client device 406. In some embodiments, the field device maintenance request may include request handling information for use by the client device 406 in performing one or more actions. In some embodiments, the request handling information is received in response to user engagement with the control system 402, for example at an earlier step such as step 456. Additionally or alternatively, in some embodiments, all or at least a portion of the request handling information is automatically identified by the control system 402 based on the field device identifier associated with the field device determined to be associated with diminished operations. In some embodiments, the control system 402 may proceed to step 462 in parallel with the occurrence of one or more steps by the other system components, for example step 460 performed by the field device and sensor(s) 404.

At step 464, the client device 406 may render one or more interfaces for selecting a field device maintenance request from a set of previously received field device maintenance request. For example, in some embodiments, the client device 406 may render a request analysis interface comprising a request selection interface element associated with each previously received field device maintenance request, including the field device maintenance request received at step 462. Each request selection interface element may be configured to receive user interaction for selecting the field device maintenance request associated with the request selection interface element. Additionally or alternatively, each request selection interface element may be rendered based on some or all of the request handling information within the associated request.

At step 466, the client device 406 may receive user interaction data indicating that the user associated with the client device 406 selected a field device maintenance request. The client device 406 may receive user interaction data and parse the user interaction data to determine the user interaction data represents selection of a request selection interface element At optional step 468, the client device 406 may transmit an indication of the selected field device maintenance request to the control system 402. In some such embodiments, the indication of the selection may include at least information identifying the selected field device maintenance request. Additionally or alternatively, the indication may include data identifying the client device 406 and/or an associated user account. In some embodiments, the client device 406 is configured to transmit the indication in response to receiving the user interaction data indicating selection of a field device maintenance request, for example at step 466.

At optional step 470, the control system 402 may transmit, to the client device 406, a second portion of request handling information associated with the selected field device maintenance request. In some such embodiments, the field device maintenance request may include only a limited first portion of the request handling information. For example, the field device maintenance request may include only the request handling information required for rendering an associated request selection interface element to a request selection interface, and the second portion of information may include the remainder of the request handling information.

At step 472, the client device 406 may render one or more interfaces associated with the selected field device maintenance request. For example, the client device 406 may render a navigation interface and/or a selected request detail interface. The navigation interface may include at least a navigation path from a user location to a field device location associated with the field device. the selected request detail interface may include at least a portion of the request handling information associated with the field device maintenance request. For example, in some embodiments, the selected request detail information includes at least the second portion of the request handling information associated with the selected field device maintenance request, for example received at step 470. Alternatively or additionally, the selected request detail interface may include all of the request handling information received in the field device maintenance request, for example received at step 462, or a subset not rendered to or otherwise indicated via the request analysis interface. The user of the client device 406 may utilize the one or more interfaces to accurately navigate to the field device, for example of the field device and sensor(s) 404, and/or perform one or more actions associated with performing maintenance of the field device.

At optional step 474, the client device 406 may receive user interaction data indicating completion of maintenance for the selected field device maintenance request and submission of a response. For example, the user may input, via user interaction, request completion information for transmitting to the control device 402 via a request completion response. In some embodiments, one or more of the navigation interface and selected request detail interface includes one or more components configured to receive user interaction for inputting the request completion information and/or submitting a request completion response. In some embodiments, the client device 406 is configured to automatically generate the request completion response and/or corresponding request completion information in response to such user interaction, for example such where the request completion information automatically determinable by the client device 406.

At optional step 476, the client device 406 may generate a request completion response comprising request completion information, and/or transmit the request completion response to the control system 402. In this regard, the request completion response may indicate that the user of the client device 406 has indicated that maintenance on the field device of the field device and sensor(s) 404 has been completed. In some embodiments, the transmission of the request completion response occurs in response to user interaction, for example the user interaction received at step 474.

At optional step 478, the control system 402 is configured to update data associated with the field device of the field device and sensor(s) 404 based on the received request completion response. In some embodiments, the request completion response includes request completion information to use in updating information associated with the field device. Additionally or alternatively, in some embodiments, the control system 402 may derive information, based on the request completion response, for use in performing one or more updates. For example, in some embodiments, the control system 402 may update device expert data associated with the field device and sensor(s) 404 to include a user account associated with the transmitted request completion response. As another example, additionally or alternatively in some embodiments, the control system 402 may update device service history data associated with the field device and sensor(s) 404 based on information automatically derived as associated with the selected field device maintenance request that was completed, and/or based on request completion information provided by the user via the request completion response, for example transmitted at step 476.

At optional step 480, the control system 402 may transmit information to the field device and sensor(s) 404 to set an operational mode associated with the field device to a normal operation mode. In some embodiments, the control system 402 may transmit a request to the field device of the field device and sensor(s) 404 to cause the field device to be set to return to operational mode.

At optional step 482, the field device and sensor(s) 404 may deactivate at least one location assistance indication component associated with the field device. For example, in some embodiments, the field device and sensor(s) 404 may deactivate the at least one location assistance indication component in response to an earlier received transmission, for example a request received at step 480. The field device and sensor(s) 404 may deactivate the location assistance indication component(s) previously activated, for example at step 460.

It should be appreciated that, in some embodiments, one or more additional system components may be included. Alternatively or additionally, in some embodiments, the system components may perform a data flow including additional and/or alternative steps, and/or may perform the included steps in a different order. It should be appreciated that the particular depicted embodiment is not to limit the scope and spirit of the disclosure.

Example Request Analysis Interface

One or more embodiments may be configured for rendering various interfaces disclosed herein. In this regard, FIG. 5 depicts an example request analysis interface 500 in accordance with example embodiments of the present disclosure. The request analysis interface may be rendered by a specially configured client device, for example embodied by the apparatus 300. In this regard, the request analysis interface 500 may be rendered to a display of the apparatus 300.

The request analysis interface 500 includes various interface elements. For example, as depicted, the request analysis interface includes a map interface element 502, a request priority summary interface element 508, and a request completion summary interface element 506. The request completion summary interface element 506 may include various text elements and/or graphical displays associated with received field device maintenance request(s). For example, the completion summary interface element 506 may include a text element associated with currently received but not selected field device maintenance requests, a text element associated with selected field device maintenance requests, and a text element associated with previously completed field device maintenance requests.

The request priority summary interface 508 may include various interface elements for indicating a number of currently received but not selected field device maintenance requests. The request priority summary interface 508 may include an interface element for each priority level associated with at least one received field device maintenance request. In other embodiments, the request priority summary interface 508 may include an interface element for each priority level of the set of all possible priority levels. Each interface element may include a numerical count of the received field device maintenance requests for a corresponding priority level.

The map interface element 502 may be configured to display a local area associated with the location of the client device, for example based on location data associated with the apparatus 300. Additionally or alternatively, the map interface element 502 may include a user location interface element 510, for example associated with user location data identified by the apparatus 300. The map interface element 502 may further include a request selection interface element set, comprising 504A-504F (collectively "request selection interface elements 504"). Each of the map interface elements 504 may be associated with a received, yet uncompleted field device maintenance request. In some embodiments, each of the request selection interface elements 504 may be configured based on request handling information included in the corresponding field device maintenance request. For example, the request handling information for each field device maintenance request may include request priority data, which may be used to configure one or more properties associated with the corresponding request selection interface element (e.g., an element color, an element size, an element image, or another property associated with interface element). As illustrated, for example, the color associated with each request selection interface element of the request selection interface elements 504 may be altered based on the request priority data of each corresponding field device maintenance request.

Each of the request selection interface elements 504 may be configured to receive user interaction. User interaction with one of the request selection interface elements 504 may represent selection of the corresponding field device maintenance request for completion. Upon selection of one of the request selection interface elements 504, the status of a corresponding field device maintenance request may be changed to indicate the request has been selected. For example, the apparatus 300 may transmit a request to a control system that indicates selection of the field device maintenance request and cause the control system to set a status to pre-determined value representing a selected status.

Example Operations Performed by Client Device Embodiments

It should be appreciated that, in some embodiments, the operations of the flowcharts, or a combination of the operations herein, may form a computer-implemented method. Further, in some embodiments, an apparatus (such as the apparatus 200 and/or apparatus 300) may be caused or otherwise configured to perform the computer-implemented method via various means, including computer-coded instructions stored to a memory of the apparatus and available to a processor for execution. In some embodiments, a non-transitory computer-readable storage medium is configured to store computer program code that, when executed by processing circuitry (such as a processor of a device, system, or apparatus) is configured to perform and/or execute the operations described.

FIG. 6 illustrates a flowchart depicting example operations for field device maintenance request management, in accordance with at least some embodiments of the present disclosure. In this regard, in some embodiments, the operations depicted are performed by a specially configured client device, for example embodied by the apparatus 300. The apparatus 300 may be in communication with one or more other devices, systems, servers, and/or the like, for example over one or more communication network(s). In an example context, the apparatus 300 may be in communication with at least a control system, for example embodied by the apparatus 200.

The depicted process begins at block 602. At block 602, the apparatus 300 includes means, such as the request processing module 310, communications module 308, processor 302, and/or the like, or a combination thereof, configured to receive, from a control system, a field device maintenance request associated with a field device. The field device maintenance request may indicate that the control system, or an operator of the control system, detected a field device is associated with deficient operations and requires maintenance. The field device maintenance request may be received via one or more communications networks. For example, the field device maintenance request may be received and processed by a network interface of the apparatus 300 for further processing.

At block 604, the apparatus 300 includes means, such as the request processing module 310, processor 302, and/or the like, or a combination thereof, configured to extract request handling information from the field device maintenance request. The request handling information may include at least a field device identifier linking the field device maintenance request to a particular field device data object corresponding to the field device associated with the field device maintenance request. In some embodiments, the request handling information may include, additionally or alternatively, at least the field device location data object. It should be appreciated that the field device maintenance request may include any of a variety of information associated with the field device data object. For example, in some embodiments, the field device maintenance request may include request handling information associated with a corresponding field device data object. The request handling information may include (1) the field device identifier, (2) a field device location data object (e.g., representing a GPS coordinate, latitude/longitude coordinate, or other indication for a location of the field device, or a navigation path from a location associated with the apparatus 300 to the location of the field device), (3) a request type identifier (e.g., indicating a problem classification or type of maintenance being requested), (4) a request description data object (e.g., a free-text data explanation of the problem, fault, and/or maintenance requested), (5) device identification data object (e.g., a tag number, a field device name, or the like), (6) a device expert data object (e.g., indicating a user account and/or identification information associated with one or more users that previously performed maintenance of the field device, or one or more pre-determined expert users associated with the request type or field device), (7) a device history service data object (e.g., previously submitted request completion responses received and stored by the control system), (8) field device environment data object (e.g., an indicator or description of whether the environment associated with the field device is safe or hazardous), (9) request priority identifier (e.g., a numerical, text, or categorical indication of the importance associated with the request), or (10) any combination thereof. In some embodiments, the field device maintenance request includes a subset of the request handling information, for example at least a field device location data object and/or other data required for rendering the field device maintenance request to a request analysis interface.

At block 606, the apparatus 300 includes means, such as the request processing module 310, input/output module 306, processor 302, and/or the like, or a combination thereof, configured to render, to a display, a request analysis interface comprising a request selection interface element configured based on the request handling information. In some embodiments, the request analysis interface may be rendered to indicate or display at least a portion of the request handling information to the user of the apparatus 300. The request selection interface element, for example, may be linked to the field device maintenance request, and configured to enable user interaction for selecting the linked field device maintenance request. The position, visual appearance, and/or other properties of the request selection interface element may be configured based on the request handling information. In some embodiments, the request selection interface element may be positioned based on field device location data object included in the request handling information, for example to provide the user with at least an indication of where the field device is located. In some embodiments, additionally or alternatively, the size, shape, color, or other visual property of the request selection interface element may be configured based on field device environment data object and/or request priority identifier, for example where the color of the request selection interface element is associated with the request priority identifier and the size of the request selection interface element is associated with the field device environment data object. One or more additional indicators may be rendered as additional interface elements associated with the request selection interface element. For example, a hazard indicator may be rendered associated with a request selection interface element when the field device environment data object indicates the environment associated with the field device is unsafe.

At block 608, the apparatus 300 includes means, such as the request processing module 310, input/output module 306, processor 302, and/or the like, or a combination thereof, configured to receive user interaction data associated with the request analysis interface. In some embodiments, for example, the user may engage a touch area or touch display of the apparatus 300. Alternatively or additionally, the apparatus 300 may receive user interaction through one or more peripheral devices (e.g., a mouse and/or keyboard, a microphone, or the like). It should be appreciated that the user interaction data may be associated with a pre-determined set of inputs (e.g., a set of possible key presses) or may require further processing (e.g., voice data requiring analysis to determine a voice command).

At block 610, the apparatus 300 includes means, such as the request processing module 310, input/output module 306, processor 302, and/or the like, or a combination thereof, configured to parse the user interaction data to determine the user interaction data indicates selection of the request selection interface element. In some embodiments, the user interaction data may be parsed by processing the user interaction data to identify a corresponding voice command associated with selecting the request selection interface element. Additionally or alternatively, the user interaction data may be parsed to identify the particular user interaction data was associated with a touch area, keystroke, or other input associated with selecting the request selection interface element. Selection of the request selection interface element may represent an indication by the user that the user intends to handle the request and perform maintenance associated with the linked field device maintenance request.

In some embodiments, the apparatus 300 includes means, such as the request processing module 310, communications module 308, processor 302, and/or the like, or a combination thereof, configured to transmit, to the control system, an indicator that represents selection of the request selection interface element. The indicator may cause the control system to change a status identifier associated with the field device maintenance request, for example to indicate the request is in the process of being selected for maintenance by the user of the apparatus 300. Additionally or alternatively, in some embodiments, the apparatus 300 may receive a second portion of request handling information as a response to the transmitted indicator. For example, the second portion of request handling information may be utilized for rendering one or more additional interfaces, such as a navigation interface, selected detail interface, and/or request completion interface. In some contexts, for example, the apparatus 300 may receive response data from the control system including one or more of (1) the field device identifier, (2) the field device location data object, (3) the request type identifier, (4) the request description data object, (5) device identification data object, (6) the device expert data object, (7) the device history service data object, (8) the field device environment data object, (9) request priority identifier, or (10) any combination thereof that was not included in the request handling information included in the field device maintenance request. In some embodiments, the second portion of retrieved request handling information includes at least the device expert data object and/or the device history service data object for rendering via one or more interfaces as described herein.

At block 612, the apparatus 300 includes means, such as the request processing module 310, communications module 308, input/output module 306, processor 302, and/or the like, or a combination thereof, configured to determine a user location. The user location may indicate a GPS coordinate, latitude/longitude coordinate, triangulated coordinate, local position, or other location coordinate associated with the position of the apparatus 300 or the associated user. In some embodiments, the user location may be determined using location services hardware associated with the apparatus 300, for example included or otherwise associated with one or more of the associated modules described above. Additionally or alternatively, the user location may be determined by parsing the user location from the request handling information received at an earlier block. In some such embodiments, for example, the control system may identify and provide a user location associated with the apparatus 300 upon communication by the apparatus 300.

At block 614, the apparatus 300 includes means, such as the request processing module 310, communications module 308, input/output module 306, processor 302, and/or the like, or a combination thereof, configured to generate a device navigation path from the user location to a field device location data object. In some embodiments, for example, the field device location data object may be included in the request handling information received at an earlier block. The device navigation path may be generated based on one or more of a public travel path map and/or a local field encoded map corresponding to a particular field within which the field device is located. In this regard, the device navigation path may enable navigation to the field device based on accessible public thoroughfares (e.g., public roadways, walkways, and/or the like) and private thoroughfares associated with the field based on the local field encoded map (e.g., private walkways for navigating through a field, such as a plant, worksite, facility, and/or the like).

The apparatus 300 may leverage one or more APIs for generating the device navigation path. As the apparatus 300 is moved by the user (for example, as the user navigates towards the field device), the device navigation path may update based on the new user location associated with the apparatus 300. In some embodiments, the apparatus 300 is configured to utilize one or more third-party systems, or third-party functionality associated with third-party hardware, software, or the like.

Alternatively, in some embodiments, the apparatus 300 may determine the device navigation path through communication with the control device. For example, in some embodiments, the apparatus 300 transmits the user location to the control system, which causes the control system to generate and return the device navigation path to the apparatus 300. Alternatively or additionally, the apparatus 300 may transmit one or more signals to the control system to cause the control system to retrieve the user location associated with the apparatus 300, and subsequently generate and return the device navigation path.

At block 616, the apparatus 300 includes means, such as the request processing module 310, input/output module 306, processor 302, and/or the like, or a combination thereof, configured to render, to the display, a navigation interface comprising the device navigation path. In some embodiments, the navigation interface may be configured to visually distinguish the device navigation path associated with one or more map interfaces (e.g., a public map, private map, or a combination thereof). As user navigates towards the field device, the apparatus 300 may alter the device navigation path based on a newly determined user location. The navigation interface may enable the user of the apparatus 300 to navigate directly to the exact location associated with the field device, without reliance on direction and/or information from the operator of the control system.

FIG. 7 illustrates additional example operations for field device maintenance request management, in accordance with some example embodiments of the present disclosure. In some embodiments, one or more of the operations depicted with respect to FIG. 7 may be performed in addition to, or alternative to, the operations depicted with respect to FIG. 6. In some embodiments, the operations depicted are performed by a specially configured client device, for example embodied by the apparatus 300. The apparatus 300 may be in communication with one or more other devices, systems, servers, and/or the like, for example over one or more communication network(s). In an example context, the apparatus 300 may be in communication with at least a control system, for example embodied by the apparatus 200.

At optional block 702, the apparatus 300 includes means, such as the request processing module 310, input/output module 306, processor 302, and/or the like, or a combination thereof, configured to render, to the display, a selected request detail interface associated with the navigation interface. In this regard, the selected request detail interface may be rendered such that it is visible in addition to the navigation interface. The selected request detail interface may include all or some of the request handling information. For example, in some embodiments, the selected request detail interface includes, based on request handling information associated with the selected field device maintenance request, one or more interface components for displaying (1) a field device location data object, (2) a request description data object, (3) device identification data object, (4) a device expert data object, (5) a device service history data object, (6) field device environment data object, (7) request priority identifier (e.g., a numerical, text, or categorical indication of the importance associated with the request), or (8) any combination thereof. Additionally or alternatively, the apparatus 300 may be configured to update some or all of the request handling information, upon request or in real-time, by communicating with the control system. For example, the apparatus 300 may communicate with the control system to update the field device environment data object based on new field device monitoring data to indicate whether environmental conditions associated with the field device are safe for entry, and display the updated field device environment data object to the user. In some embodiments, additionally or alternatively, the selected request detail interface and/or navigation interface may include an interface element configured to receive user interaction indicating completion of maintenance associated with the selected field device maintenance request.

At optional block 704, the apparatus 300 includes means, such as the request processing module 310, input/output module 306, processor 302, and/or the like, or a combination thereof, configured to render a request completion interface comprising a completion interface element set. In some embodiments, the completion interface element set comprises one or more interface elements, where the completion interface element set is configured to receive request completion information in response to user interaction with the interface elements of the completion interface element set. For example, the completion interface element set may include one or more text and/or categorical inputs configured to receive user interaction associated with a portion of request completion information. For example, the completion interface element set may include an input for receiving data representing a description of the performed maintenance, time completion data, or other data to be used in generating and/or storing a request completion response.

At optional block 706, the apparatus 300 includes means, such as the request processing module 310, input/output module 306, processor 302, and/or the like, or a combination thereof, configured to receive completion user interaction data associated with the request completion interface. In some embodiments, for example, the user may engage a touch area or touch display of the apparatus 300. Alternatively or additionally, the apparatus 300 may receive completion user interaction data through one or more peripheral devices (e.g., a mouse and/or keyboard, a microphone, or the like). It should be appreciated that the completion user interaction data may be associated with a predetermined set of inputs (e.g., a set of possible key presses) or may require further processing (e.g., voice data requiring analysis to determine a voice command).

At optional block 708, the apparatus 300 includes means, such as the request processing module 310, processor 302, and/or the like, or a combination thereof, configured to parse the completion user interaction data to determine the completion user interaction data indicates submission of the request completion information, for example entered via one or more completion interface element(s). In some embodiments, the completion user interaction data may be parsed by processing the completion user interaction data to identify a corresponding voice command associated with submitting the request completion information. Additionally or alternatively, the completion user interaction data may be parsed to identify the particular completion user interaction data was associated with a touch area, keystroke, or other input associated with submitting the request completion information. In some embodiments, for example, the completion user interaction data may be parsed and determined to be associated with a particular submission interface element (e.g., a submit button) included in the request completion interface.

At optional block 710, the apparatus 300 includes means, such as the request processing module 310, processor 302, and/or the like, or a combination thereof, configured to transmit, to the control system, a request completion response associated with the field device maintenance request, the request completion response comprising the request completion information. In some embodiments, the apparatus 300 utilizes such means to generate the request completion response for transmission. Additionally or alternatively, the apparatus 300 may include information and/or data in the request completion response for use in identifying the field device maintenance request. For example, example the apparatus 300 may include at least a field device maintenance request identifier associated with the field device maintenance request.

The transmission of the request completion response may cause the control system to perform various actions. For example, in some embodiments, the apparatus 300 may cause the control system to update a request status identifier associated with the field device maintenance request. Additionally or alternatively, at optional block 708, the apparatus 300 includes means, such as the request processing module 310, processor 302, and/or the like, or a combination thereof, configured to cause the control system to include the request completion information in a device service history data object associated with the field device. For example, the request completion information may be used to update the service history data object to include a summarization of the maintenance performed by the user of apparatus 300. This service history data object may then be provided in a future circumstance where a subsequent field device maintenance request is transmitted and/or selected associated with the field device. Additionally or alternatively, the apparatus 300 may cause the control system to update a device expert data object, and/or other field device related data based on the request completion information.

The operations described above with respect to FIGS. 6 and 7 provide particular operations for field device maintenance request management by processing, transmitting, and rendering specific data and/or corresponding specially configured interfaces. Such operations enable a specially configured apparatus to provide several solutions and/or technical and user-experience advantages over conventional apparatuses, devices, and systems. For example, the specific processes provide efficiently generated and organization visual interfaces specifically designed to enable efficient analysis and decision-making by a user based on the interfaces.

Example Operations Performed by Control System Embodiments

Figure 8:
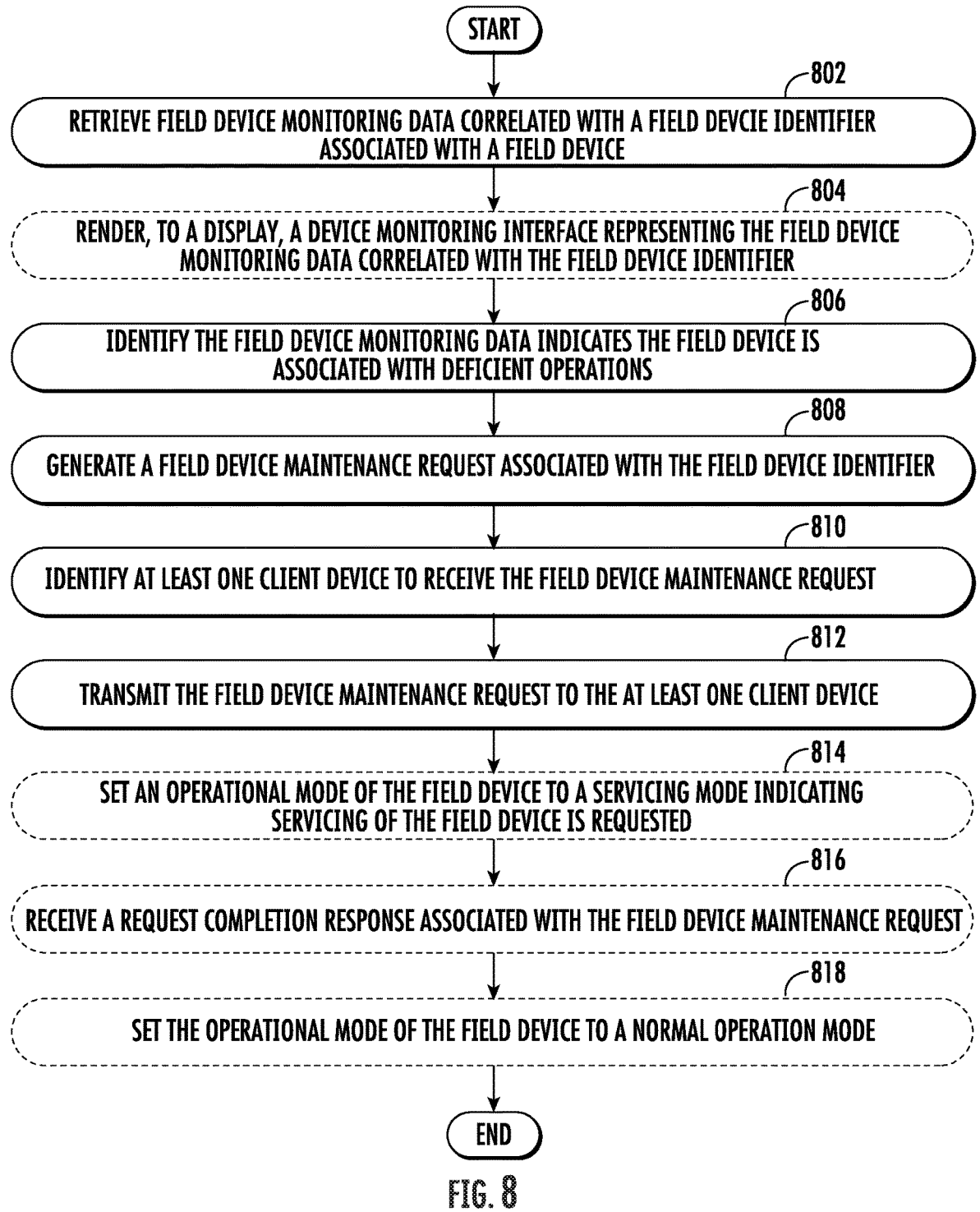

FIG. 8 illustrates a flowchart depicting example operations for field device maintenance request management, in accordance with at least some embodiments of the present disclosure. In this regard, in some embodiments, the operations depicted are performed by a control system, for example embodied by the apparatus 200. The apparatus 200 may be in communication with one or more other devices, systems, servers, and/or the like, for example over one or more communication network(s). In an example context, the apparatus 200 may be in communication with at least one client device, for example embodied by the apparatus 300.

The depicted process begins at block 802. At block 802, the apparatus 200 includes means, such as the field device process monitoring and control module 210, request management module 212, communications module 208, input/output module 206, processor 202, and/or the like, or a combination thereof, configured to retrieve field device monitoring data correlated with a field device identifier associated with a field device. In this regard, each field device may be represented by a field device data object comprising a field device identifier, for example such that the control system may associated various data with the field device using the field device identifier. The field device monitoring data may be retrieved from the field device itself and/or one or more sensors associated with the field device, or from one or more datastores configured to receive the field device monitoring data from the control system and/or at least one third-party system.

The field device monitoring data may be associated with various properties associated with the functioning of the field device, or properties associated with the environment of the field device. For example, the field device monitoring data may be associated with the processing rate of a field device, output of a field device, temperature of one or more components of the field device and/or associated environment, chemical composition of the environment, or any other determinable characteristic. In some embodiments, the field device monitoring data is retrieved in real-time, enabling decision making based on the field device monitoring data that reflects the current condition of the field device. In some embodiments, the real-time nature of the system may enable an operator to identify and request maintenance of a field device before the condition of the field device from causes significant problems associated with operations of a field.

At optional block 804, the apparatus 200 includes means, such as the field device process monitoring and control module 210, request management module 212, communications module 208, input/output module 206, processor 202, and/or the like, or a combination thereof, configured to render, to a display, a device monitoring interface representing the field device monitoring data. The device monitoring interface may include text, graphical, and/or other visual representations of the field device monitoring data, or text, graphical, and/or other visual representations of data derived from the field device monitoring data. It should be appreciated that the device monitoring interface may be rendered as a sub-component of a larger interface, for example which may include a plurality of device monitoring interfaces, each associated with a field device of a plurality of field devices. In this regard, a user of the apparatus 200 may view the rendered interface(s) for various decision-making purposes and analysis.

In some embodiments, the field device monitoring data rendered to one or more interfaces includes, or is associated with, one or more maintenance alarms triggered by one or more maintenance conditions. For example, the apparatus 200 may only render only a subset of retrieved data, such as field device monitoring data (or corresponding summary data) triggering a maintenance alarm when the field device monitoring data for a particular field device indicates the field device requires maintenance. In some such contexts, the triggered maintenance alarm may be rendered as summary information, for example indicating a field device identifier (or other identification information) for the field device associated with the triggered maintenance alarm, and/or information associated with the fault or problem detected based on the field device monitoring data.

At block 806, the apparatus 200 includes means, such as the field device process monitoring and control module 210, request management module 212, communications module 208, input/output module 206, processor 202, and/or the like, or a combination thereof, configured to identify the field device monitoring data indicates the field device is associated with deficient operations. In some embodiments, the apparatus 200 is configured to identify the field device monitoring data indicates the field device is associated with deficient operations by receiving user interaction indicative that the field device is associated with deficient operations. For example, the user interaction may represent a user desire to initiate generation and/or transmission of a field device maintenance request associated with the field device identifier for the engaged device monitoring interface. In this regard, the user may provide such user interaction after analyzing the field device monitoring interface to make such a determination.

Additionally or alternatively, in some embodiments, the apparatus 200 may include such means configured to process the field device monitoring data to identify the field device monitoring data indicates the field device is associated with deficient operations. For example, the apparatus 200 may be configured to process the field device monitoring data and, to identify the field device is associated with deficient operations, determine the field device monitoring data is not within a normal operating zone. Alternatively or additionally, the apparatus 200 may be configured to determine the field device monitoring data indicates one or more hazardous environmental conditions. In some embodiments, the apparatus 200 may identify the field device monitoring data indicates the field device is associated with deficient operations based on one or more of the processes described herein with respect to FIG. 9A or FIG. 9B.

At block 808, the apparatus 200 includes means, such as the field device process monitoring and control module 210, request management module 212, communications module 208, input/output module 206, processor 202, and/or the like, or a combination thereof, configured to generate a field device maintenance request associated with the field device identifier. In some such embodiments, the apparatus 200 may retrieve, receive, and/or identify request handling information for including in the field device maintenance request. The apparatus 200 may receive some or all of the request handling information in response to user interaction. Additionally or alternatively, some or all of the request handling information may be automatically retrieved, for example from one or more datastores, and/or otherwise identified, based on the field device identifier. In some embodiments, the field device maintenance request may include, at minimum, request handling information to be used by a client device for generating a request analysis interface, as described herein.

At block 808, the apparatus 200 includes means, such as the field device process monitoring and control module 210, request management module 212, communications module 208, input/output module 206, processor 202, and/or the like, or a combination thereof, configured to identify at least one client device to receive the field device maintenance request. In some embodiments, the apparatus 200 may maintain a list of client devices currently accessing the apparatus 200, for example client device(s) associated with an authenticated session for communicating with the apparatus 200. In yet some other embodiments, the apparatus 200 may identify a user account identifier list associated with user accounts linked to a particular field device (e.g., user accounts associated with field engineers pre-determined to be associated with the field device represented by a field device data object having the associated field device identifier, and the apparatus may utilize the user account identifier list to identify the list of client devices (or corresponding client device identifiers) to receive the field device maintenance request. Alternatively or additionally, in some embodiments, the apparatus 200 may identify a client device identifier list including client device identification information linked to a field device.

At block 812, the apparatus 200 includes means, such as the request management module 212, communications module 208, processor 202, and/or the like, or a combination thereof, configured to transmit the field device maintenance request to the at least one client device. In some embodiments, the apparatus 200 may identify and/or utilize client device identification information to transmit the field device maintenance request to each client device. For example, the apparatus 200 may identify an IP address associated with each client device identified as associated with the field device identifier. The apparatus 200, in some embodiments, may transmit the field device maintenance request to the one or more client devices over one or more communication networks, for example via one or more networking interfaces of the apparatus 200.

At optional block 814, the apparatus 200 includes means, such as the field device process monitoring and control module 210, request management module 212, communications module 208, processor 202, and/or the like, or a combination thereof, configured to set an operational mode of the field device to a servicing mode. The servicing mode may indicate that servicing of the field device is requested, or in other words, that at least one field device maintenance request has been transmitted. In some embodiments, the apparatus 200 transmits a request to the field device via one or more communications network to cause the field device to set the operational mode of the field device to a servicing mode. For example, in some embodiments, the apparatus 200 identifies a network identifier associated with the field device and transmits a request, or other transmission, to the field device that is configured to set the operational mode of the field device to the servicing mode (for example, where the operational mode to be set is represented by an integer indicator, categorical indicator, or other data included in the transmission).

In response to setting the operational mode to a servicing mode, the field device may cease operation within the field and/or perform one or more actions associated with receiving maintenance. For example, in some embodiments, the apparatus 200 may cause the field device to activate at least one location assistance indication component by transmitting the request, or other transmission, to the field device and/or otherwise setting the operational mode of the field device to a servicing mode. In some embodiments, the field device may include a location assistance indication component comprising at least one light emitting component, where the light emitting component may emit light when in servicing mode. Alternatively or additionally, the at least one light emitting component may flash and/or blink while in servicing mode. Alternatively or additionally, in some embodiments, the field device may include a location assistance indication component comprising location services hardware. The location services hardware may be activated to enable the apparatus 200 to retrieve and/or otherwise determine a device location data object associated with the field device while the field device is in servicing mode. It should be appreciated that the location services hardware may include various hardware, circuitry, and/or the like, configured to enable such determinations using GPS, triangulation, and/or the like. Additionally or alternatively, in some embodiments, at least one location assistance indication component comprises a display for rendering information associated with the field device, such as field device identification information (e.g., a field device tag, name, serial number, or the like) for inspection by a field engineer.

At optional block 816, the apparatus 200 includes means, such as the field device process monitoring and control module 210, request management module 212, communications module 208, processor 202, and/or the like, or a combination thereof, configured to receive a request completion response associated with the field device maintenance request. In some embodiments, the request completion response is received from one of the client devices to which the field device maintenance request was transmitted at an earlier block. The request completion response may indicate that a user has completed maintenance associated with the field device as requested via the field device maintenance request. In some embodiments, the request completion response may include completion response information, for example including a field device maintenance request identifier for associating the request completion response with the field device maintenance request.

At optional block 818, the apparatus 200 includes means, such as the field device process monitoring and control module 210, request management module 212, communications module 208, processor 202, and/or the like, or a combination thereof, configured to set the operational mode of the field device to a normal operation mode. The normal operation mode may indicate that servicing of the field device has been completed, or in other words, that a request completion response, or other indication maintenance was completed, has been received. In some embodiments, the apparatus 200 transmits a second request to the field device via one or more communications network to cause the field device to set the operational mode of the field device to the normal operation mode. For example, in some embodiments, the apparatus 200 identifies a network identifier associated with the field device and transmits a request, or other transmission, to the field device that is configured to set the operational mode of the field device to the normal operation mode (for example, where the operational mode to be set is represented by a second integer indicator, second categorical indicator, or other data included in the transmission).

In response to setting the operational mode to a normal operation mode, the field device may resume operation within the field and/or perform one or more actions associated with completed maintenance. For example, in some embodiments, the apparatus 200 may cause the field device to deactivate the at least one location assistance indication component previously activated. The apparatus 200 may cause the field device to deactivate the at least one location assistance indication component by transmitting the request, or other transmission, to the field device and/or otherwise setting the operational mode of the field device to the normal operation mode. As described above, such location assistance indication component(s) may include one or more of at least one light emitting component, location services hardware, and/or one or more display(s).

FIGS. 9A and 9B illustrate additional example operations for field device maintenance request management, specifically to identify field device monitoring data indicates the field device is associated with deficient operations, in accordance with some example embodiments of the present disclosure. In some embodiments, one or more of the operations depicted with respect to FIGS. 9A and 9B may be performed in addition to, or alternative to, the operations depicted with respect to FIG. 8. In some embodiments, the operations depicted are performed by a specially configured control system, for example embodied by the apparatus 200. The apparatus 200 may be in communication with one or more other devices, systems, servers, and/or the like, for example over one or more communication network(s). In an example context, the apparatus 200 may be in communication with at least one client device, for example embodied by the apparatus 300.

The process depicted in FIG. 9A begins at block 902A, which may occur after one or more blocks as illustrated in FIG. 8, for example after block 802. At block 902A, the apparatus 200 includes means, such as the field device process monitoring and control module 210, request management module 212, communications module 208, input/output module 206, processor 202, and/or the like, or a combination thereof, configured to determine at least a portion of the field device monitoring data is outside of a normal operating zone. Each portion of the field device monitoring data may represent a particular measured property associated with the corresponding field device. In this regard, each portion of the field device monitoring data may be processed to determine if the field device monitoring data is within a normal operating zone. For example, in some embodiments, each portion of the field device monitoring data is associated with a normal operating data object that represents the normal operating zone. In some such embodiments, the apparatus 200 may include such means configured to identify and/or otherwise retrieve one or more normal operating data object(s) associated with the field device monitoring data. The apparatus 200 may compare each portion of the retrieved field device monitoring data with a corresponding normal operating data object to determine at least one portion of the field device monitoring data is outside of the normal operating zone (e.g., exceeds an upper threshold or falls below an upper threshold represented by the normal operating data object, or falls within an upper and lower threshold represented by the normal operating data object.

The process depicted in FIG. 9B begins at block 902B, which may occur after one or more blocks as illustrated in FIG. 8, for example after optional block 804. At block 902A, the apparatus 200 includes means, such as the field device process monitoring and control module 210, request management module 212, communications module 208, input/output module 206, processor 202, and/or the like, or a combination thereof, configured to receive user interaction data indicating a request to transmit the field device maintenance request associated with the field device identifier. In some embodiments, the apparatus 200 may receive user interaction data in response to user interaction with one or more of the components of apparatus 200, for example a touch display, one or more peripherals, or the like. In some embodiments, for example, the apparatus 200 may receive user interaction data associated with a rendered device monitoring interface, and in response render one or more interface elements configured to receive user input representing a portion of request handling information to be included in the generated field device maintenance request. Additionally or alternatively, the interface elements may include a interface element for submitting the request handling information and indicating a user desire to generate and/or transmit a corresponding field device maintenance request.

At block 904B, the apparatus 200 includes means, such as the field device process monitoring and control module 210, request management module 212, communications module 208, input/output module 206, processor 202, and/or the like, or a combination thereof, configured to parse the user interaction data to identify request handling information associated with the field device identifier. The user interaction data may indicate user engagement with a particular interface component for submitting input request handling information (e.g., a submit button rendered to or associated with a device monitoring interface). For example, in some embodiments, a user may interact with the rendered device monitoring interface to cause rendering of various interface elements configured to receive, in response to subsequent user interaction, at least a portion of request handling information for including in a field device maintenance request. The request handling information parsed from the user interaction data may include various request handling information represented by and/or associated with input by a user. For example, in some embodiments, the request handling information includes a field device identifier, request type identifier, request description data object, and/or any combination thereof.

FIG. 10 illustrates additional example operations for field device maintenance request management, specifically to identify field device monitoring data indicates the field device is associated with deficient operations, in accordance with some example embodiments of the present disclosure. In some embodiments, one or more of the operations depicted with respect to FIG. 10 may be performed in addition to, or alternative to, the operations depicted with respect to FIG. 8. In some embodiments, the operations depicted are performed by a specially configured control system, for example embodied by the apparatus 200. The apparatus 200 may be in communication with one or more other devices, systems, servers, and/or the like, for example over one or more communication network(s). In an example context, the apparatus 200 may be in communication with at least one client device, for example embodied by the apparatus 300.

The process depicted in FIG. 10 begins at block 1002, which may occur after one or more blocks as illustrated in FIG. 8, for example after block 804 or in some embodiments after block 802. At block 1002, the apparatus 200 includes means, such as the field device process monitoring and control module 210, request management module 212, communications module 208, memory 204, processor 202, and/or the like, or a combination thereof, configured to query a device information repository using the field device identifier. In some embodiments, the device identification repository may be associated with one or more datastores associated with the apparatus 200. The device information repository may include one or more data objects stored linked to a particular device identifier. For example, the device information repository may include data objects and/or other information embodying request handling information to be included in a field device maintenance request associated with the field device identifier. For example, the device information repository may store field device location data object(s) associated with a field device identifier, device identification data object(s) associated with a field device identifier, device expert data object(s) associated with a field device identifier, device history service data object(s) associated with a field device identifier, normal operating data object(s) associated with a field device, and/or any combination thereof. In some embodiments, the device information repository may include one or more sub-repositories for segmenting the various stored data objects and/or information.

At block 1004, the apparatus 200 includes means, such as the field device process monitoring and control module 210, request management module 212, processor 202, and/or the like, or a combination thereof, configured to identify a portion of the request handling information from response data received associated with the query. For example, in some embodiments, the apparatus 200 may receive response data from the device information repository based on the executed query. The response data may include various retrieved data object(s) associated with the field device identifier used to perform the query. The apparatus 200 may identify a portion of the request handling information by parsing the response data to identify request handling information to be included in a subsequent field device maintenance request. In some embodiments, apparatus 200 is configured to pre-determine the request handling information to be included in the request, such that the apparatus 200 may parse and/or otherwise extract such data from the response data.

At block 1006, the apparatus 200 includes means, such as the field device process monitoring and control module 210, request management module 212, processor 202, and/or the like, or a combination thereof, configured to generate a field device maintenance request comprising at least the portion of the request handling information. In some embodiments, the field device maintenance request includes, or is otherwise associated with the field device identifier used to retrieve the request handling information retrieved via the query performed at an earlier block. Additionally or alternatively, in some embodiments, the field device maintenance request may include additional request handling information in addition to the request handling information retrieved via the device information repository. For example, the field device maintenance request may include a portion of request handling information submitted via user interaction, such as the data objects described with respect to FIG. 9B. Additionally or alternatively, in an example context, the field device maintenance request may additionally include automatically identified data as described above with respect to FIGS. 8 and/or 9B.

FIG. 11 illustrates additional example operations for field device maintenance request management, specifically for receiving a request completion response and updating information based on the request completion response, in accordance with some example embodiments of the present disclosure. In some embodiments, one or more of the operations depicted with respect to FIG. 11 may be performed in addition to, or alternative to, the operations depicted with respect to FIG. 8. In some embodiments, the operations depicted are performed by a specially configured control system, for example embodied by the apparatus 200. The apparatus 200 may be in communication with one or more other devices, systems, servers, and/or the like, for example over one or more communication network(s). In an example context, the apparatus 200 may be in communication with at least one client device, for example embodied by the apparatus 300.

At block 1102, the apparatus 200 includes means, such as the field device process monitoring and control module 210, request management module 212, communications module 208, processor 202, and/or the like, or a combination thereof, configured to receive a request completion response associated with the field device maintenance request, the request completion response including request completion information. In some embodiments, the request completion response is received from one of the client devices to which the field device maintenance request was transmitted at an earlier block. The request completion response may indicate that a user has completed maintenance associated with the field device as requested via the field device maintenance request. The request completion information may include a variety of automatically provided and/or user provided data objects, for example including a field device maintenance request identifier for associating the request completion response with the field device maintenance request and/or one or more user-provided description data object(s) (e.g., a description data object representing the maintenance actions performed). In some embodiments, the request completion information may include a field device identifier associated with the request completion response and/or identified from the associated field device maintenance request.

At optional block 1104, the apparatus 200 includes means, such as the field device process monitoring and control module 210, request management module 212, communications module 208, processor 202, and/or the like, or a combination thereof, configured to update a device service history data object associated with the field device identifier based on the request completion response. In some embodiments, for example, the apparatus 200 may parse and/or otherwise extract a maintenance description data object included in the request completion information, and include the maintenance description data object in the device service history data object. In this regard, the device service history data object for a particular field device identifier may function as a ledger of all previously performed maintenance actions for the particular field device. Upon subsequently providing the device service history data object, the apparatus 200 device service history data object may thus be up-to-date to enable a user of a client device to efficiently identify previous actions for the field device requiring maintenance.

In some embodiments, the apparatus 200 is configured to append some or all of the request completion information to a device service history data object. For example, the device service history data object may embody and/or be formed of a blockchain including one or more records embodying previous submitted user information upon completion of maintenance, for example via a request completion response. The apparatus 200 may be configured to parse the blockchain to identify the device service history data object, and/or append data to the blockchain to update the device service history data object.

Additionally or alternatively, at optional block 1106, the apparatus 200 includes means, such as the field device process monitoring and control module 210, request management module 212, communications module 208, processor 202, and/or the like, or a combination thereof, configured to update a device expert data object associated with the field device identifier based on the field completion response. In some embodiments, for example, the request completion information includes a user account identifier associated with the user account data object of the user that submitted the request completion response (e.g., indicating the user completed maintenance of the field device associated with the field device identifier). The apparatus 200 may update the device expert data object by adding the user account identifier to the device expert data object to indicate the user associated with the user account identifier is an expert associated with the field device (or in other words, the user has previously performed maintenance on the field device). In other embodiments, the user account identifier may replace a second user account identifier associated with a different user account for a user that performed a previous maintenance action for the field device corresponding to the field device identifier. In other embodiments, the apparatus 200 is configured to retrieve (for example, from a user data repository) a user account data object, or a subset of information included in a user account data object, associated with the user account identifier. For example, the apparatus 200 may retrieve contact information, name information, and/or other information to be provided to other users that desire to contact the expert user, for example by contacting them via a client device. In some embodiments, the apparatus may store the retrieved information to the device expert data object (in addition to or to replace existing data) to update the device service history data object. In this regard, upon subsequent provision of the device expert data object to a client device (for example, for rendering to one or more interfaces), the user associated with the client device may access the up-to-date device expert data object to contact a known expert user associated with a field device associated with a field device maintenance request.

In some embodiments, the apparatus 200 may automatically identify the user account identifier and/or corresponding information to be stored instead of parsing and/or extracting the user account identifier, and/or other user account information to be stored, from the request completion information. For example, in some embodiments, the apparatus 200 may be configured to identify a client device identifier and/or other information associated with the client device from which the request completion response was retrieved. Additionally or alternatively, the apparatus 200 may use a client device identifier, alone or in combination with other information, to identify the user account identifier and/or corresponding user account data object information to include in the device expert data object. For example, the apparatus 200 may maintain a list of client device identifiers and/or other information that correspond to a user account data object accessing the apparatus 200 for an authenticated session.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for field device maintenance request management, the apparatus comprising at least one processor and at least one memory, the at least one memory having computer-coded instructions thereon, the computer-coded instructions configured to, in execution with the at least one processor, configure the apparatus to:

receive, from a control system in response to a determination by the control system that field device monitoring data associated with a field device indicates deficient operations of the field device, a field device maintenance request associated with the field device that comprises an environmental condition data object indicating a hazardous environment condition associated with the field device;

extract request handling information from the field device maintenance request;

render, to a display of the apparatus, a request analysis interface comprising request selection interface elements indicating a plurality of field device maintenance requests that are selectable, each request analysis interface elements of the any number of request selection interface elements visually configured based on an associated field device maintenance request of, wherein the request analysis interface is automatically rendered comprising a request selection interface element in response to receiving the field device maintenance request from the control system, the request selection interface element indicating the field device maintenance request is selectable, and the request selection interface element rendered based on at least the environmental condition data object indicating the hazardous environment condition associated with the field device;

receive, via an interaction with the display, user interaction data associated with the request analysis interface;

parse the user interaction data to determine the user interaction data indicates selection of the request selection interface element associated with the field device maintenance request;

determine, using location services hardware, a user location;

generate a device navigation path from the user location to a field device location data object; and render, to the display, a navigation interface comprising the device navigation path.

2. The apparatus of claim 1, wherein the field device maintenance request is one of a plurality of field device maintenance requests further comprising one or more additional field device maintenance requests, and wherein the apparatus is configured to render, to the display, the request analysis interface comprising an additional request interface element for each of the one or more additional field device maintenance requests, each additional request interface element visually configured based on an associated additional field device maintenance request of the one or more additional field device maintenance requests and automatically rendered in response to receiving the associated additional field device maintenance request.

3. The apparatus of claim 1, wherein the request handling information additionally comprises one or more of (1) a request priority identifier, (2) a request type identifier, (3) a request description data, (4) device identification data, (5) a device expert data object, (6) a device service history data object, or (7) the field device location data object.

4. The apparatus of claim 3, wherein the request selection interface element is rendered comprising a request information interface element set, each request information interface element in the request information interface element set associated with a portion of the request handling information.

5. The apparatus of claim 3, wherein the request selection interface element comprises at least one interface element comprising at least one visual property configured based on a portion of the request handling information.

6. The apparatus of claim 1, further configured to:
render, to the display, in response to the determination the user interaction data indicates selection of the request selection interface element, a selected request detail interface associated with the navigation interface,
wherein the selected request detail interface comprises at least one interface element representing at least a portion of the request handling information.

7. The apparatus of claim 1, further configured to:
render a request completion interface comprising a completion interface element set configured to receive request completion information in response to user interaction with the interface elements of the completion interface element set;
receive completion user interaction data associated with the request completion interface;
parse the completion user interaction data to determine the completion user interaction data indicates submission of the request completion information; and
transmit, to the control system, a request completion response associated with the field device maintenance request, the request completion response comprising the request completion information, wherein the request completion response is configured to cause the control system to include the request completion information in a device service history data object associated with the field device.

8. A computer-implemented method for field device maintenance request management, the method comprising:
receiving, from a control system in response to a determination by the control system that field device monitoring data associated with a field device indicates deficient operations of the field device, a field device maintenance request associated with the field device that comprises an environmental condition data object indicating a hazardous environment condition associated with the field device;
extracting request handling information from the field device maintenance request;
rendering, to a display, a request analysis interface comprising request selection interface elements indicating a plurality of field device maintenance requests that are selectable, each request analysis interface elements of the any number of request selection interface elements visually configured based on an associated field device maintenance request of, wherein the request analysis interface is automatically rendered comprising a request selection interface element in response to receiving the field device maintenance request from the control system, the request selection interface element indicating the field device maintenance request is selectable, and the field device maintenance request, the request selection interface element rendered based on at least the environmental condition data object indicating the hazardous environment condition associated with the field device;
receiving, via an interaction with the display, user interaction data associated with the request analysis interface;
parsing the user interaction data to determine the user interaction data indicates selection of the request selection interface element associated with the field device maintenance request;
determining, based on location services hardware, a user location;
generating a device navigation path from the user location to a field device location data object; and
rendering, to the display, a navigation interface comprising the device navigation path.

9. The computer-implemented method of claim 8, wherein the field device maintenance request is one of a plurality of field device maintenance requests further comprising one or more additional field device maintenance requests, and wherein rendering the request analysis interface further comprises rendering, to the display, the request analysis interface comprising an additional request interface element for each of the one or more additional field device maintenance requests, each additional request interface element visually configured based on an associated additional field device maintenance request of the one or more additional field device maintenance requests and automatically rendered in response to receiving the associated additional field device maintenance request.

10. The computer-implemented method of claim 8, wherein the request handling information additionally comprises one or more of (1) a request priority identifier, (2) a request type identifier, (3) a request description data, (4) device identification data, (5) a device expert data object, (6) a device service history data object, or (7) the field device location data object.

11. The computer-implemented method of claim 10, wherein the request selection interface element is rendered comprising a request information interface element set, each request information interface element in the request information interface element set associated with a portion of the request handling information.

12. The computer-implemented method of claim 10, wherein the request selection interface element comprises at least one interface element comprising at least one visual property configured based on a portion of the request handling information.

13. The computer-implemented method of claim 8, further comprising:
rendering, to the display, in response to the determination the user interaction data indicates selection of the request selection interface element, a selected request detail interface associated with the navigation interface,
wherein the selected request detail interface comprises at least one interface element representing at least a portion of the request handling information.

14. The computer-implemented method of claim 8, further comprising:
rendering a request completion interface comprising a completion interface element set configured to receive request completion information in response to user interaction with the interface elements of the completion interface element set;
receiving completion user interaction data associated with the request completion interface;
parsing the completion user interaction data to determine the completion user interaction data indicates submission of the request completion information; and transmitting, to the control system, a request completion response associated with the field device maintenance request, the request completion response comprising the request completion information, wherein the request completion response is configured for causing the control system to include the request completion information in a device service history data object associated with the field device.

15. A computer program product for field device maintenance request management, the computer program product comprising at least one non-transitory computer-readable computer storage medium having computer program instructions thereon, the computer program instructions, in execution with at least one processor, configured to:
receive, from a control system in response to a determination by the control system that field device monitoring data associated with a field device indicates deficient operations of the field device, a field device maintenance request associated with the field device that comprises an environmental condition data object indicating a hazardous environment condition associated with the field device;
extract request handling information from the field device maintenance request;
render, to a display, a request analysis interface comprising request selection interface elements indicating a plurality of field device maintenance requests that are selectable, each request analysis interface elements of the any number of request selection interface elements visually configured based on an associated field device maintenance request of, wherein the request analysis interface is automatically rendered comprising a request selection interface element in response to receiving the field device maintenance request from the control system, the request selection interface element indicating the field device maintenance request is selectable, and the field device maintenance request, the request selection interface element rendered based on at least the environmental condition data object indicating the hazardous environment condition associated with the field device
receive, via an interaction with the display, user interaction data associated with the request analysis interface;
parse the user interaction data to determine the user interaction data indicates selection of the request selection interface element associated with the field device maintenance request;
determine, based on an input from location services hardware, a user location;
generate a device navigation path from the user location to a field device location data object; and
render, to the display, a navigation interface comprising the device navigation path.

16. The computer program product of claim 15, wherein the request handling information additionally comprises one or more of (1) a request priority identifier, (2) a request type identifier, (3) a request description data, (4) device identification data, (5) a device expert data object, (6) a device service history data object, or (7) the field device location data object.

17. The computer program product of claim 16, wherein the request selection interface element is rendered comprising a request information interface element set, each request information interface element in the request information interface element set associated with a portion of the request handling information.

18. The computer program product of claim 16, wherein the request selection interface element comprises at least one interface element comprising at least one visual property configured based on a portion of the request handling information.

19. The computer program product of claim 16, further configured to:
render, to the display, in response to the determination the user interaction data indicates selection of the request selection interface element, a selected request detail interface associated with the navigation interface,
wherein the selected request detail interface comprises at least one interface element representing at least a portion of the request handling information.

20. The computer program product of claim 16, further configured to:
render a request completion interface comprising a completion interface element set configured to receive request completion information in response to user interaction with the interface elements of the completion interface element set;
receive completion user interaction data associated with the request completion interface;
parse the completion user interaction data to determine the completion user interaction data indicates submission of the request completion information; and
transmit, to the control system, a request completion response associated with the field device maintenance request, the request completion response comprising the request completion information, wherein the request completion response is configured to cause the control system to include the request completion information in a device service history data object associated with the field device.

* * * * *